United States Patent
Yang et al.

(10) Patent No.: US 10,390,250 B2
(45) Date of Patent: Aug. 20, 2019

(54) METHOD FOR PERFORMING MEASUREMENT IN WIRELESS DEVICE HAVING PLURALITY OF RF CHAINS

(71) Applicant: LG ELECTRONICS INC., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/558,954

(22) PCT Filed: Mar. 24, 2016

(86) PCT No.: PCT/KR2016/002983
§ 371 (c)(1),
(2) Date: Sep. 15, 2017

(87) PCT Pub. No.: WO2016/153286
PCT Pub. Date: Sep. 29, 2016

(65) Prior Publication Data
US 2018/0084448 A1 Mar. 22, 2018

Related U.S. Application Data

(60) Provisional application No. 62/138,411, filed on Mar. 26, 2015, provisional application No. 62/164,500, filed on May 20, 2015.

(51) Int. Cl.
*H04W 4/00* (2018.01)
*H04W 24/10* (2009.01)
(Continued)

(52) U.S. Cl.
CPC ............... *H04W 24/10* (2013.01); *H04L 5/00* (2013.01); *H04W 16/32* (2013.01); *H04W 72/044* (2013.01); *H04W 72/085* (2013.01)

(58) Field of Classification Search
None
See application file for complete search history.

(56) References Cited

U.S. PATENT DOCUMENTS

| | | |
|---|---|---|
| 2011/0009117 A1 | 1/2011 | Breuer et al. |
| 2012/0178465 A1 | 7/2012 | Lin et al. |

(Continued)

FOREIGN PATENT DOCUMENTS

WO  WO 2015/023222 A1  2/2015

*Primary Examiner* — Farah Faroul
(74) *Attorney, Agent, or Firm* — Birch, Stewart, Kolasch & Birch, LLP

(57) ABSTRACT

A disclosure of the present specification provides a method for performing measurement in a wireless device having a plurality of radio frequency (RF) chains for supporting aggregation of multiple carriers. The method may comprise the steps of: receiving, from a base station, information including measurement configuration (MeasConfig) information that includes a measurement gap (MG) for performing inter-frequency measurement; when the number of the received measurement gaps is one, determining, among the multiple carriers, a carrier corresponding to the RF chain to which the one measurement gap is to be applied; and transmitting, to the base station, a measurement report including the result of performing inter-frequency measurement by applying the measurement gap to the RF chain for the determined carrier. When the number of the received measurement gaps is one, the measurement report may include an indication of the carrier to which the measurement gap has been applied.

17 Claims, 21 Drawing Sheets

(51) Int. Cl.
*H04L 5/00* (2006.01)
*H04W 16/32* (2009.01)
*H04W 72/04* (2009.01)
*H04W 72/08* (2009.01)

(56) References Cited

U.S. PATENT DOCUMENTS

| | | | | |
|---|---|---|---|---|
| 2013/0010710 | A1* | 1/2013 | Lidian | H04W 36/0094 370/329 |
| 2013/0235755 | A1* | 9/2013 | Lucky | H04W 72/12 370/252 |
| 2014/0293818 | A1* | 10/2014 | Sesia | H04B 17/318 370/252 |
| 2014/0341192 | A1* | 11/2014 | Venkob | H04L 5/001 370/336 |
| 2015/0016282 | A1 | 1/2015 | Su | |
| 2015/0223245 | A1* | 8/2015 | Cheng | H04W 48/16 370/329 |
| 2015/0245235 | A1* | 8/2015 | Tang | H04W 36/0088 370/252 |
| 2015/0341815 | A1* | 11/2015 | Kim | H04L 1/00 370/252 |
| 2017/0006510 | A1* | 1/2017 | Kaikkonen | H04H 20/38 |

* cited by examiner

METHOD FOR PERFORMING MEASUREMENT IN WIRELESS DEVICE HAVING PLURALITY OF RF CHAINS

CROSS REFERENCE TO RELATED APPLICATIONS

This application is the National Phase of PCT International Application No. PCT/KR2016/002983, filed on Mar. 24, 2016, which claims priority under 35 U.S.C. 119(e) to U.S. Provisional Application No. 62/138,411, filed on Mar. 26, 2015 and 62/164,500, filed on May 20, 2015, all of which are hereby expressly incorporated by reference into the present application.

BACKGROUND OF THE INVENTION

Field of the Invention

The present invention relates to mobile communication

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Further, a user equipment continuously measures the quality of a serving cell that provides a service currently and the quality of a neighboring cell. Largely, this measurement includes the measurement of a reference signal received power (RSRP) and the measurement of a reference signal received quality (RSRQ). The RSRQ is represented by the value of the RSRP divided by a received signal strength indicator (RSSI).

Further, identification and measurement for another cell operating at a frequency different from a frequency of the serving cell is performed during a time interval determined by a measurement gap (MG).

Conventionally, it is assumed that the wireless device contains only one RF chain, so that the base station provides only one measurement gap (MG) to the wireless device or UE. However, although a wireless device has recently been improved to include more than one RF chains for carrier aggregation (CA), the base station still provides only one measurement gap (MG) to the wireless device. If the base station provides only one measurement gap, the UE applies one measurement gap (MG) to all of two or more RF chains. During the measurement gap period, the wireless device stops transmission/reception with all cells via carrier aggregation (CA). Therefore, this is inefficient.

SUMMARY OF THE INVENTION

Accordingly, an object of the present invention is to solve the above-mentioned problems.

In one aspect of the present disclosure, there is provided a method for performing measurement by a wireless device having a plurality of radio frequency (RF) chains to support aggregation of a plurality of carriers, the method comprising: receiving measurement configuration (MeasConfig) information from a base station, wherein the MeasConfig information includes information about a measurement gap (MG) in which measurement on an inter-frequency is performed; when the received measurement gap is one, determining a carrier among the plurality of carrier, wherein said one measurement gap is to be applied to a RF chain among the plurality of the RF chains corresponding to the determined carrier; applying said one measurement gap to the determined RF chain to perform the measurement on the inter-frequency to obtain the measurement result; and transmitting a measurement report to the base station wherein the measurement report includes the measurement result, wherein when the received measurement gap is one, the measurement report includes an indication to indicate the carrier corresponding to the determined RF chain subjected to the measurement gap.

In one embodiment, determining the carrier includes determining that the measurement gap is to be applied to a RF chain for a primary cell (Pcell) in the carrier aggregation (CA).

In one embodiment, the information about the measurement gap includes at least one of a gap pattern ID, a measurement gap length (MGL) and a gap offset, wherein the measurement configuration information further includes a measurement cycle (measCycleScell) for a secondary cell (Scell) when the secondary cell in the carrier aggregation (CA) is in an inactive state, wherein a measurement on the inactive Scell is performed based on the measCycleScell.

In one embodiment, the measurement cycle (measCycleScell) and the measurement gap are determined such that a time period in which the RF chain is returned based on the measurement gap (MG) does not overlap a time period in which the measurement on the inactive Scell is performed based on the measurement cycle (measCycleScell).

In one embodiment, the measurement gap (MG) is determined to be allocated within a time period in which the measurement on the inactive Scell is not performed.

In one embodiment, the method further comprises transmitting capability information to the base station, the capability information including at least one of information about carrier aggregation (CA) capability and information about dual connectivity (DC) capability.

In one embodiment, when the transmitted capability information indicates that the wireless device has the carrier aggregation (CA) capability or the dual connectivity (DC) capability, the received measurement configuration (MeasConfig) information includes information on a plurality of measurement gaps (MGs).

In one embodiment, the plurality of measurement gaps include first and second measurement gaps, wherein a gap pattern ID of the first measurement gap and a gap pattern ID of the second measurement gap are configured to be equal to each other, and a gap offset of the first measurement gap and a gap offset of the second first measurement gap are configured to be equal to each other.

In one embodiment, when the plurality of measurement gaps is received by the device, the measurement cycle (measCycleScell) and the plurality of measurement gaps (MG) are configured such that subframes corresponding to the measurement gaps (MGs) does not overlap a subframe correspond to the measurement cycle (measCycleScell).

In another aspect of the present disclosure, there is provided a wireless device for performing measurement, wherein the device includes a plurality of radio frequency (RF) chains to support aggregation of a plurality of carriers, the device comprising: a communication unit configured to receive measurement configuration (MeasConfig) information from a base station, wherein the MeasConfig information includes information about a measurement gap (MG) in which measurement on an inter-frequency is performed; and a processor configured: when the received measurement gap is one, to determine a carrier among the plurality of carrier, wherein said one measurement gap is to be applied to a RF chain among the plurality of the RF chains corresponding to the determined carrier; to apply said one measurement gap to the determined RF chain to perform the measurement on the inter-frequency to obtain the measurement result; and to enable the communication unit to transmit a measurement report to the base station wherein the measurement report includes the measurement result, wherein when the received measurement gap is one, the measurement report includes an indication to indicate the carrier corresponding to the determined RF chain subjected to the measurement gap.

According to the embodiment of the present disclosure, the aforementioned problem of the related art is solved.

DESCRIPTION OF EXEMPLARY EMBODIMENTS

Figure 1:
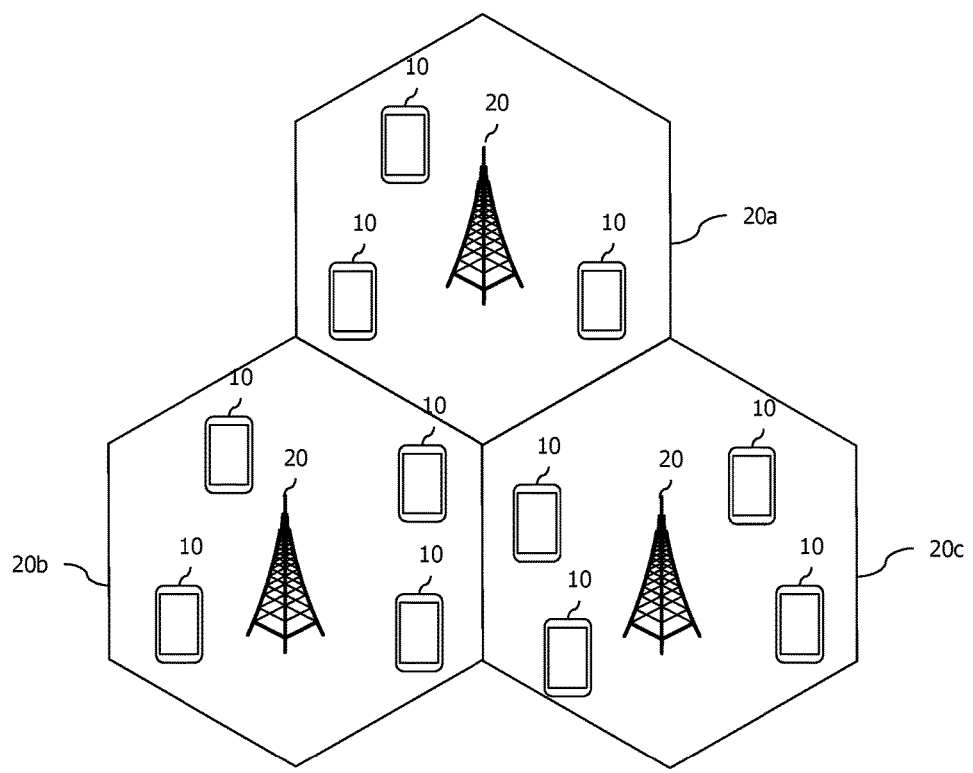
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Further, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
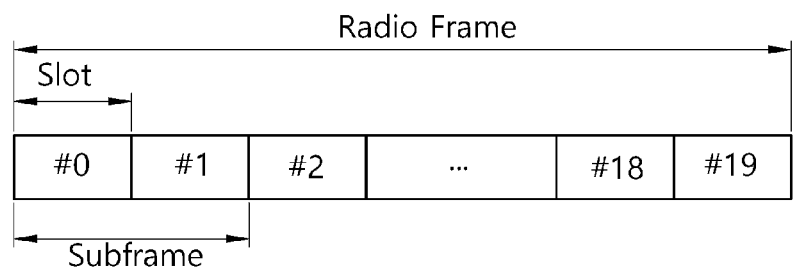
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Moreover, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
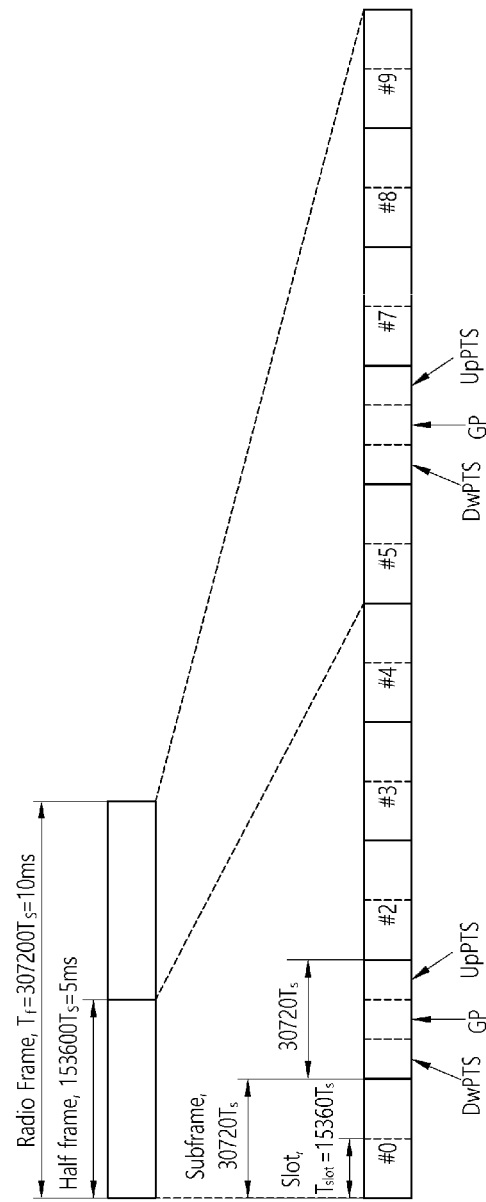
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592 * Ts | 2192 * Ts | 2560 * Ts | 7680 * Ts | 2192 * Ts | 2560 * Ts |
| 1 | 19760 * Ts | | | 20480 * Ts | | |
| 2 | 21952 * Ts | | | 23040 * Ts | | |
| 3 | 24144 * Ts | | | 25600 * Ts | | |
| 4 | 26336 * Ts | | | 7680 * Ts | 4384 * Ts | 5120 * ts |
| 5 | 6592 * Ts | 4384 * Ts | 5120 * ts | 20480 * Ts | | |
| 6 | 19760 * Ts | | | 23040 * Ts | | |
| 7 | 21952 * Ts | | | — | | |
| 8 | 24144 * Ts | | | — | | |

Figure 4:
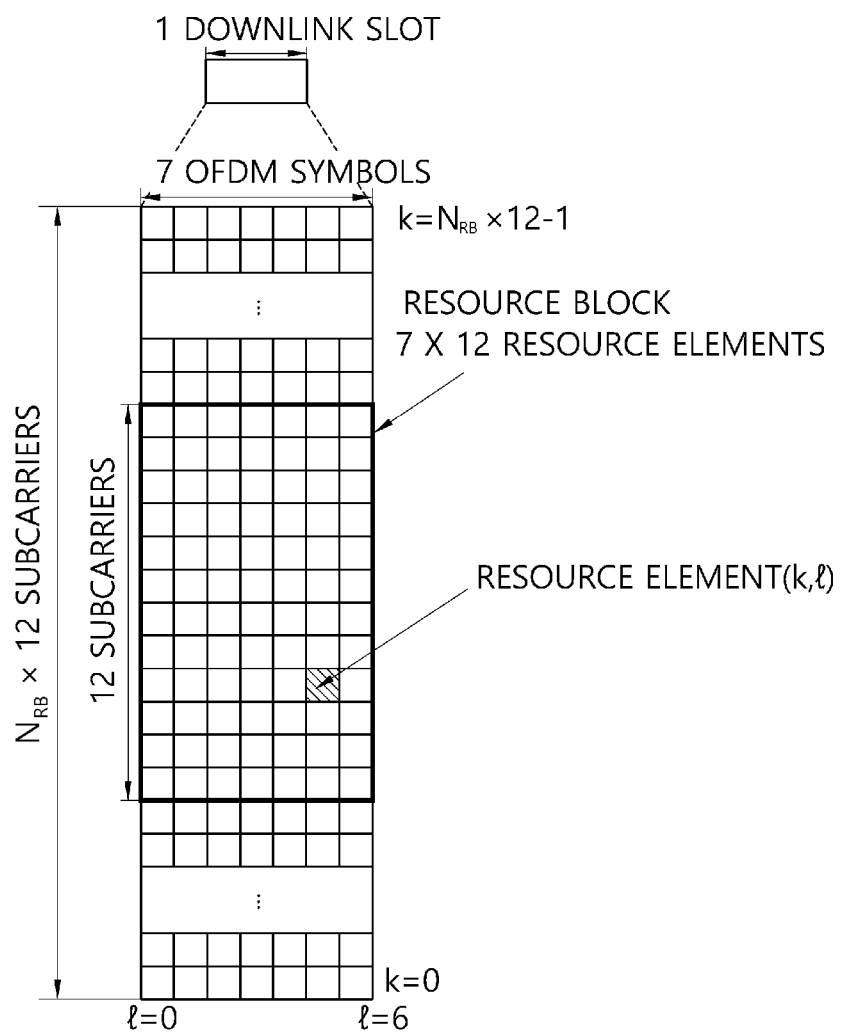
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Further, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
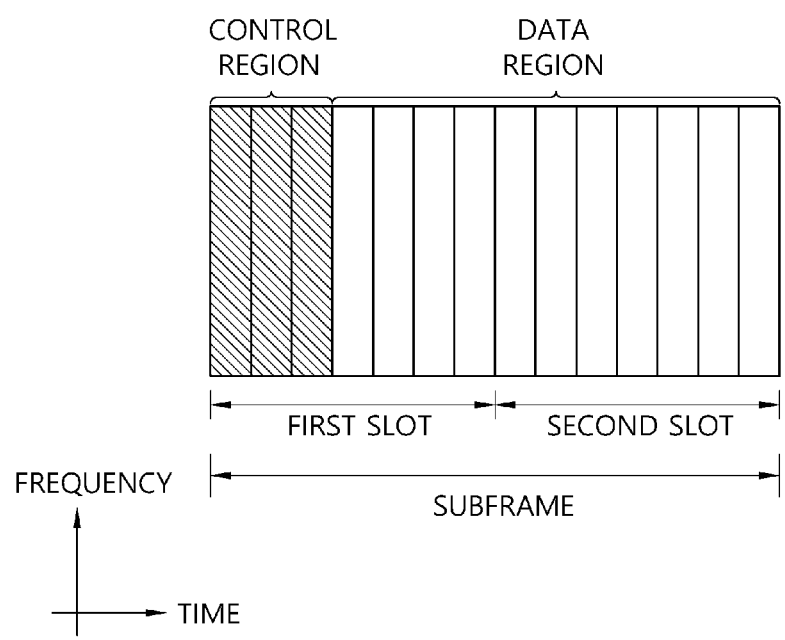
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 6:
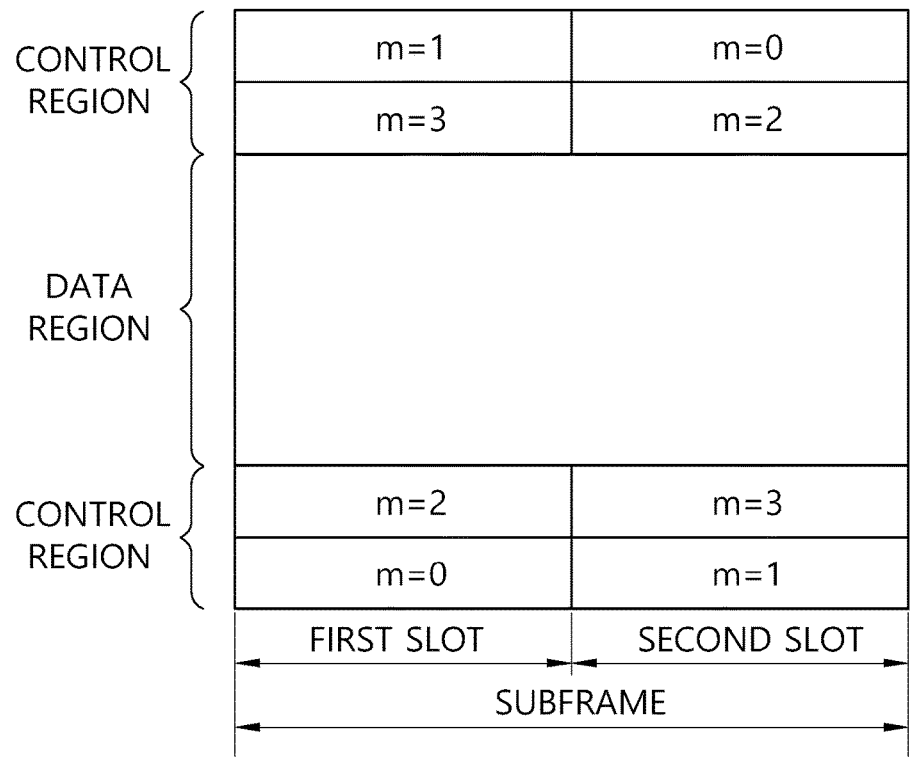
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation (CA)>

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

A CA system may be divided into a contiguous CA system, in which aggregated carriers are contiguous, and a non-contiguous CA system in which aggregated carriers are not contiguous. It should be understood that a CA system used hereinafter indicates both the case where aggregated carriers are contiguous and the case where aggregated carriers are non-contiguous. The number of CCs aggregated in a downlink and the number of CCs aggregated in an uplink may be set differently. A case where the number of downlink CCs and the number of uplink CCs are the same, it is called symmetric aggregation, and the opposite case is called asymmetric aggregation.

Further, CA technologies may be divided into an inter-band CA technology and an intra-band CA technology. The inter-band CA is a method which employs aggregation of CCs existing in different bands, and the intra-band CA technology is a method which employs aggregation CCs in the same frequency band. More specifically, the CA technologies is divided into intra-band contiguous CA, intra-band non-contiguous CA, and inter-band non-contiguous CA.

Figure 7A:
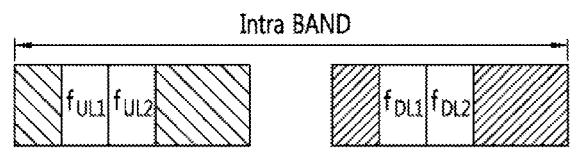
FIG. 7A illustrates intra-band contiguous CA.
Figure 7B:
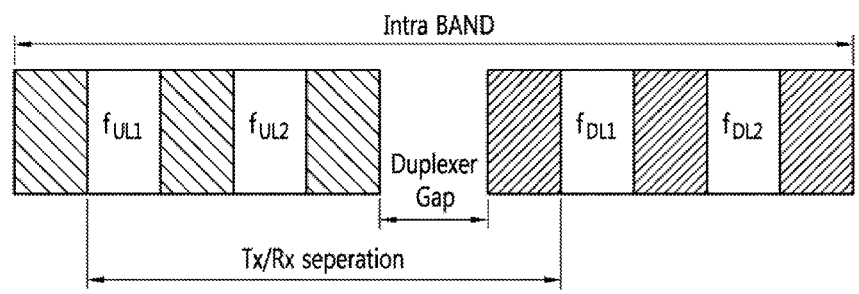
FIG. 7B illustrates intra-band non-contiguous CA.

FIGS. 7A and 7B are conceptual diagrams illustrating intra-band CA.

FIG. 7A illustrates intra-band contiguous CA, and FIG. 7B illustrates intra-band non-contiguous CA.

For high-speed wireless transmission, various techniques have been added to LTE-Advance system, including uplink MIMO and CA. CA discussed in LTE-Advance system may be divided into intra-band contiguous CA, shown in FIG. 6A, and intra-band non-contiguous CA, shown in FIG. 6B.

Figure 8A:
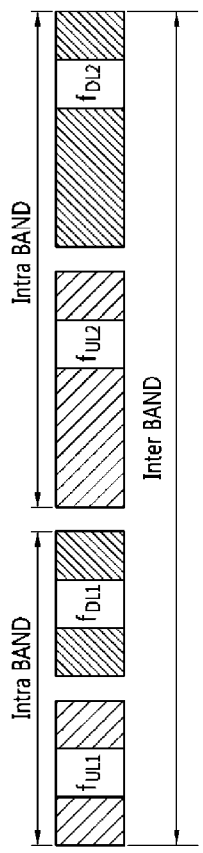
FIG. 8A illustrates a combination of a low band and a high band for inter-band CA.
Figure 8B:
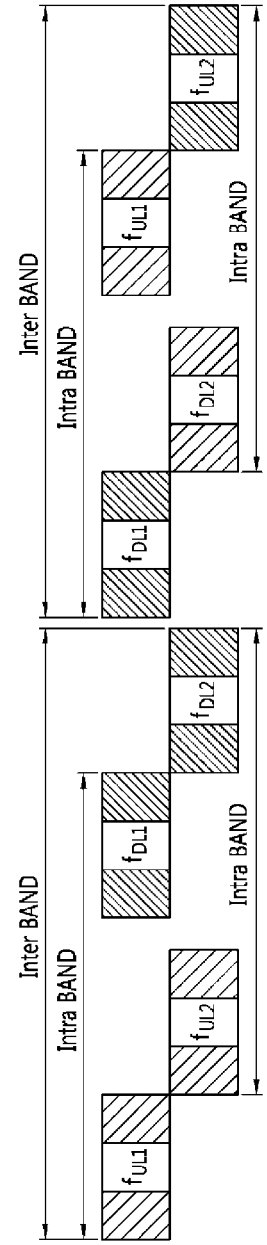
FIG. 8B illustrates a combination of neighboring frequency bands for inter-band CA.

FIGS. 8A and 8B are conceptual diagrams illustrating inter-band CA.

FIG. 8A illustrates a combination of a low band and a high band for inter-band CA, and FIG. 8B illustrates a combination of neighboring frequency bands for inter-band CA.

That is, inter-band CA may be divided into: inter-band CA between a low-band carriers and high-band carriers, as shown in FIG. 7A, which have different radio frequency (RF) characteristics; and inter-band CA between neighboring frequencies, as shown in FIG. 7B, which have similar RF characteristics and therefore each CC is able to use a common RF port.

TABLE 3

| | E-UTRA Operating Band | | |
|---|---|---|---|
| | Uplink (UL) Operating Band $F_{UL\_low}$-$F_{UL\_high}$ | Downlink (DL) Operating Band $F_{UL\_low}$-$F_{UL\_high}$ | Duplex Mode |
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 61 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A N/A | 1452 MHz-1496 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz 2690 MHz | 2496 MHz 2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

3GPP LTE/LTE-A system has defined uplink (UL) and downlink (DL) operating bands, as shown in the above Table 3. Four CA cases shown in FIGS. 7 and 8 can be distinguished with reference to Table 3.

Here, $F_{UL\_low}$ denotes the lowest frequency in an UL operating band. $F_{UL\_high}$ denotes the highest frequency in an UL operating band. $F_{DL\_low}$ denotes the lowest frequency in an DL operating band. $F_{DL\_high}$ denotes the highest frequency in a DL operating band.

Figure 9A:
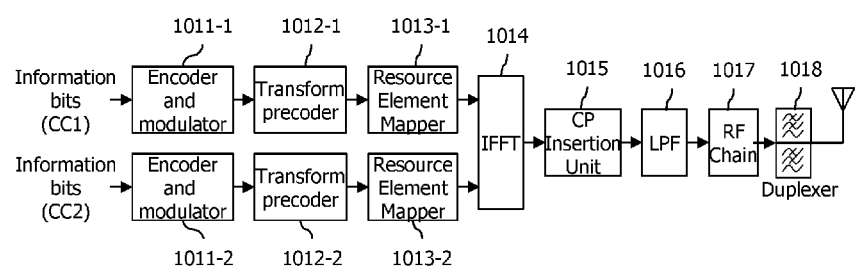
FIG. 9A exemplarily illustrates the structure of a transmitter for a contiguous intra-band CA, and FIG. 9B exemplarily illustrates the structure of a transmitter for an inter-band CA.
Figure 9B:
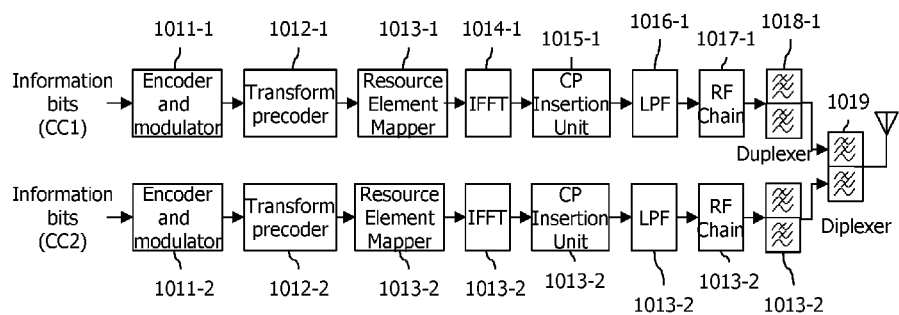

FIG. 9A exemplarily illustrates the structure of a transmitter for a contiguous intra-band CA, and FIG. 9B exemplarily illustrates the structure of a transmitter for an inter-band CA.

First, as may be seen with reference to FIG. 9A, the transmitter for an intra-band CA includes encoder and modulators 1101-1/1101-2 for a first CC CC1 and a second CC CC2, transform precoders 1012-1/1102-2, and resource element mappers 1013-1/1103-2. Furthermore, the transmitter includes an IFFT (inverse fast Fourier Transform) unit 1014, a CP (cyclic prefix) insertion unit 1015, an LPF (Low pass filter) 1016, an RF chain 1017, and a duplexer 1018. The resource element mapper 1013-1 for the first CC CC1 and the resource element mapper 1013-2 for the second CC CC2 are connected to said one IFFT unit 1014.

Each of the encoder and decoders 1011-1/1011-2 forms coded data by encoding received information bits according to a predetermined coding method for the first CC CC1 and the second CC CC2. The coded data is called a codeword. Next, each of the encoder and decoders 1011-1/1011-2 disposes the codeword in the form of a symbol that represents the location on a signal constellation. A modulation scheme is not limited.

Each of the transform precoders 1012-1/1102-2 processes the input symbol using an MIMO method according to multiple transmission antennas. For example, each of the transform precoders 1012-1/1102-2 may use codebook-based precoding.

Each of the resource element mappers 1013-1/1103-2 maps the symbol output by the transform precoder 230 to resource elements.

The IFFT unit 1014 performs IFFT (Inverse Fast Fourier Transform) on the symbol output by each of the resource element mappers 1013-1/1103-2.

The CP insertion unit 1015 inserts a CP (cyclic prefix) into the time domain symbol on which the IFFT has been performed.

The symbols into which the CPs have been inserted experience the LPF (Low pass filter) 1016, combined with carriers while passing through the RF chain 1017, and transmitted to an antenna via the duplexer 1018. The duplexer 1018 functions to separate a transmission (Tx) signal and a reception (RX) signal.

As described above, in the case of the transmitter supporting an intra-band consecutive CA, ODFM modulation through one IFFT unit 1014 is possible. Accordingly, the RF chain 1017 can also be solely implemented.

Further, as may be seen with reference to FIG. 9*b*, in the transmitter for an inter-band CA, IFFT units 1014-1/1104-2, CP insertion units 1015-1/1105-2, LPFs 1016-1/1106-2, RF chains 1017-1/1107-2, and duplexers 1018-1/1108-2 are separately present for the first CC CC1 and the second CC CC2.

Signals that have passed through the respective duplexers 1018-1/1108-2 are combined through the diplexer 1019. The combined signal is transmitted through an antenna. That is, the diplexer 1019 combines the first CC CC1 and the second CC CC2 upon transmission and separates the first CC CC1 and the second CC CC2 upon reception.

As described above, in the case of a transmitter supporting an inter-band CA, a baseband and an RF chain need to be placed in each CC due to the limit of a processing bandwidth.

<Reference Signal>

ARS is described below.

In general, transmission information, for example, data is easily distorted and changed while it is transmitted through a radio channel. Accordingly, a reference signal is required in order to demodualte such a transmission information without an error.

The reference signal is a signal known to both a transmitter and a receiver and is transmitted along with transmission information. Since transmission information transmitted by a transmitter experiences a corresponding channel for each transmission antenna or layer, a reference signal may be allocated to each transmission antenna or layer. A reference signal for each transmission antenna or layer may be identified using resources, such as a frequency and code. A reference signal may be used for two purposes, that is, the demodulation and channel estimation of transmission information.

A downlink reference signal may be divided into a cell-specific reference signal (CRS), an MBSFN (multimedia broadcast and multicast single frequency network) reference signal, a UE-specific reference signal (UE-specific RS, URS), a positioning reference signal (positioning RS, PRS), and a CSI reference signal (CSI-RS). The CRS is a reference signal transmitted to all UEs within a cell and also called a common reference signal. The CRS may be used for the channel measurement of CQI feedback and the channel estimation of PDSCH. The MBSFN reference signal may be transmitted in a subframe allocated for MBSFN transmission. The URS is a reference signal received by a specific UE or specific UE group within a cell and may be called a demodulation reference signal (DM-RS). The DM-RS is chiefly used for a specific UE or specific UE group to perform data demodulation. The PRS may be used to estimate the location of UE. The CSI-RS is used for the channel estimation of the PDSCH of LTE-A UE. The CSI-RSs are deployed relatively sparsely in a frequency domain or time domain and may be punctured in the data region of a common subframe or MBSFN subframe.

Figure 10:
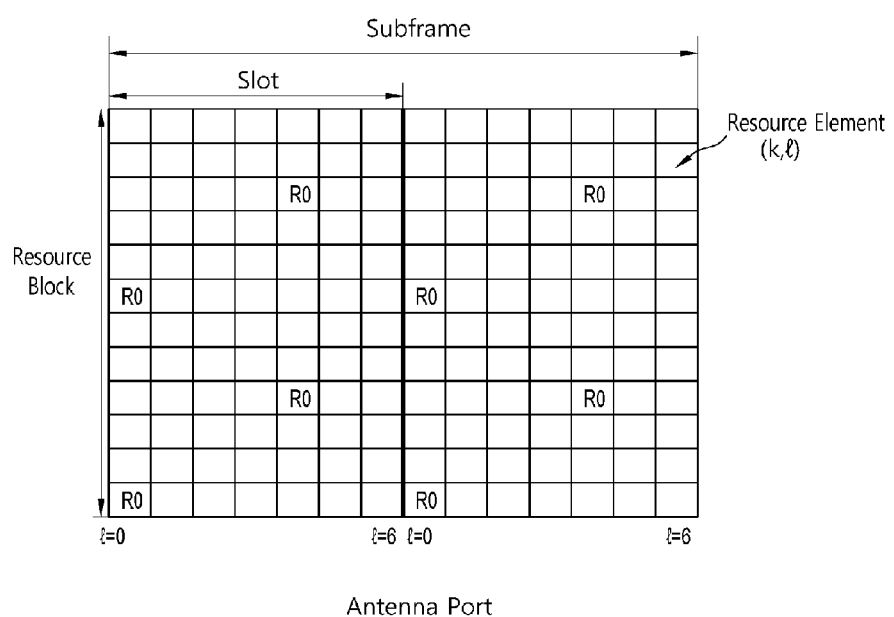
FIG. 10 illustrates an exemplary pattern with which a CRS is mapped to a RB, if a base station uses a single antenna port.

FIG. 10 illustrates an exemplary pattern with which a CRS is mapped to a RB, if a base station uses a single antenna port.

Referring to FIG. 10, R0 illustrates a resource element (RE) to which a CRS transmitted by antenna port number 0 of the base station is mapped.

The CRS is transmitted in all downlink subframes in a cell supporting a PDSCH transmission. The CRS may be transmitted on the antenna port number 0 to 3.

The RE allocated to the CRS of a single antenna port can not be used for the transmission of other antenna ports, and should be configured as zero. Further, the CRS is only transmitted on a non-MBSFN (multicast-broadcast single frequency network) region in a MBSFN subframe.

<Measurement and Measurement Report>

In a mobile communication system, a mobility support for UE 100 is essential. Accordingly, the UE 100 continues to measure quality of a serving cell that now provides service to the UE 100 and quality of neighbor cells. The UE 100 reports a measurement result to a network at a proper time, and the network provides optimal mobility to the UE through handover. Measurement for such a purpose is frequently called radio resource management (RRM).

Moreover, the UE 100 monitors downlink quality of a primary cell (Pcell) based on a CRS. This is called RLM (Radio Link Monitoring). For such RLM, the UE 100 estimates downlink quality and compares the estimated downlink quality with thresholds, for example, Qout and Qin. The threshold Qout is defined as a level in which downlink reception cannot be stably performed, and corresponds to 10% error of PDCCH transmission by taking into consideration a PCFICH error. The threshold Qin is defined as a level in which downlink may be very significantly reliable compared to the threshold Qout, and corresponds to 2% error of PDCCH transmission by taking into consideration a PCFICH error.

Figure 11:
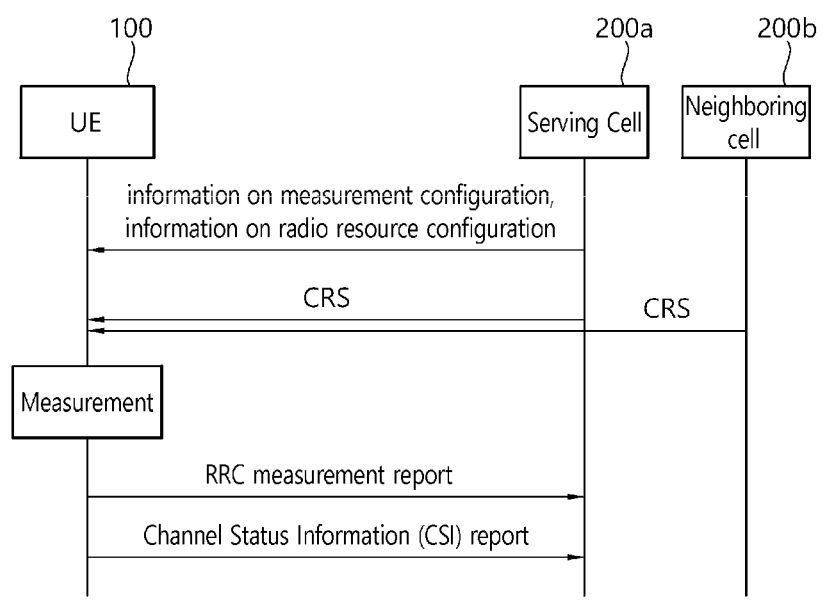
FIG. 11 illustrates a measurement and a measurement report procedure.

FIG. 11 illustrates a measurement and a measurement report procedure.

As may be seen with reference to FIG. 11, when a serving cell 200*a* and a neighbor cell 200*b* transmits a respective CRS (Cell-specific Reference Signal) to the UE 100, the UE 100 performs measurement through the CRS and transmits an RRC measurement report message, including a measurement result, to the serving cell 200*a*.

In this case, the UE 100 may perform measurement using the following three methods.

1) RSRP (reference signal received power): This indicates the mean reception power of all REs that carry a CRS transmitted in the entire band. In this case, the mean reception power of all REs that carry a CSI RS instead of the CRS may be measured.

2) An RSSI (received signal strength indicator): This indicates reception power measured in the entire band. The RSSI includes all of a signal, interference, and thermal noise.

3) RSRQ (reference symbol received quality): This indicates a CQI, and may be determined to be an RSRP/RSSI according to a measurement bandwidth or subband. That is, the RSRQ means an SINR (signal-to-noise interference ratio). The RSRP does not provide sufficient mobility information, and thus RSRQ may be used in a handover or cell reselection process instead of RSRP.

The RSRQ may be calculated as an RSSI/RSSP.

Further, the UE 100 receives a radio resource configuration (RRC) information element (IE) as shown. The radio resource configuration (RRC) dedicated information element (IE) is used to configure/modify/release a radio bearer, or modify a MAC configuration etc. The radio resource configuration IE includes subframe pattern information. The subframe pattern information is information on a measurement resource restriction pattern in a time domain to measure the RSRP, and the RSRQ for the serving cell (e.g. a primary cell).

Meanwhile, the UE 100 receives a measurement configuration (hereinafter also called "measconfing") information element (IE) from the serving cell 100 a. A message including the measurement configuration IE is called a measurement configuration message. In this case, the measurement configuration IE may be received through an RRC connection reconfiguration message. If a measurement result satisfies a report condition within the measconfing information, the UE reports the measurement result to an eNodeB. A message including the measurement result is called as a measurement report message.

The measurement configuration IE may include measurement object information. The measurement object information is information about an object on which UE may perform measurement. The measurement object includes at least one of an intra-frequency measurement target that is the subject of intra-cell measurement, an inter-frequency measurement target that is the subject of inter-cell measurement, and an inter-RAT measurement target that is the subject of inter-RAT measurement. For example, the intra-frequency measurement target may indicate a neighbor cell having the same frequency band as a serving cell, and the inter-frequency measurement target may indicate a neighbor cell having a frequency band different from that of a serving cell, and the inter-RAT measurement target may indicate a neighbor cell having an RAT.

TABLE 4

Description of measurement object field carrierFreq: E-UTRA carrier frequency to which a configuration is applied
measCycleSCell: measuring cycle for an inactive SCell. A value thereof may be set to 160, 256, and so on. When the value is 160, it indicates that measurement is performed for every 160 subframes.

Further, the measurement configuration IE includes an IE (Information Element) as shown in the following table.

TABLE 5

Description of MeasConfig field allowInterruptions
If a value thereof is True, this indicates that interruption of transmission and reception of UE with the serving cell is allowed when the UE performs measurement for carriers of an inactive Scell using MeasCycleScell
measGapConfig
Configuration or de-configuration of measurement gap The measGapConfig may be used to execute configuration or de-configuration of the measurement gap (MG).

The measurement gap (MG) is an interval used for performing identification and RSRP measurement of another cell operating at a frequency (inter frequency) different from a frequency of the serving cell.

TABLE 6

Description of MeasGapConfig field gapOffset
The value of gapOffset may be set to either gp0 or gp1.
The gp0 corresponds to a gap offset of pattern ID "0" having MGRP = 40 ms.
The gp1 corresponds to a gap offset of pattern ID "1" having MGRP = 80 ms.

TABLE 7

| Gap pattern Id | Measurement gap length (MGL) | Measurement Gap Repetition Period (MGRP | Minimum time to perform measurements for inter-frequency and inter-RAT for the 480 ms period |
|---|---|---|---|
| 0 | 6 ms | 40 ms | 60 ms |
| 1 | 6 ms | 80 ms | 30 s |

When the UE requires a measurement gap to identify and measure a cell at an inter-frequency and inter-RAT, the E-UTRAN (i.e., the base station) may provide a single measurement gap (MG) pattern with a predetermined gap period to the UE.

The UE does not transmit or receive any data from the serving cell for the measurement gap period, retunes its RF chain to be adapted to the inter-frequency, and then performs measurement at the corresponding inter-frequency.

<Introduction of Small Cell>

In the next generation mobile communication system, a small cell having a small cell coverage radius is expected to be added to the coverage of a conventional cell. The small cells are expected to handle more traffic. Since the conventional cell has a larger coverage than the small cell, it may be referred to as a macro cell. Hereinafter, FIG. 12 will be described.

Figure 12:
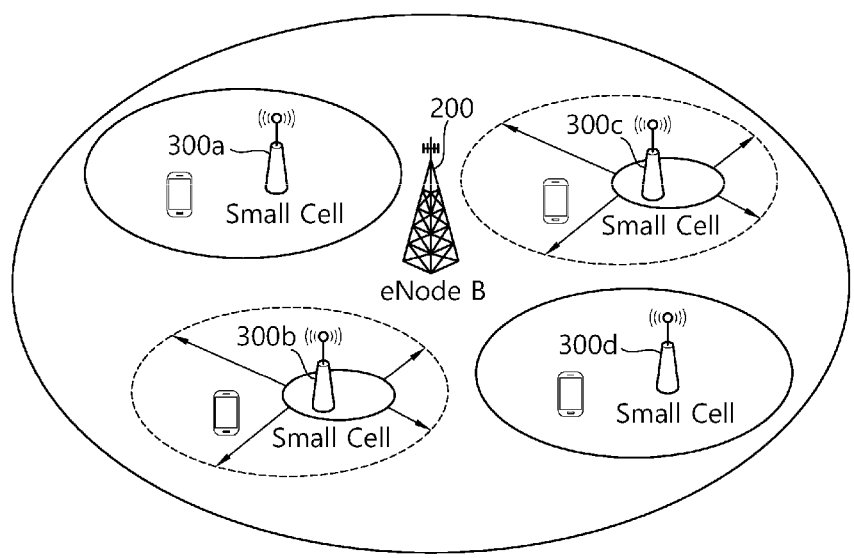
FIG. 12 is a diagram showing an environment of a mixed heterogeneous network of a macro cell and a small cell, which may be a next generation wireless communication system.

FIG. 12 is a diagram showing an environment of a mixed heterogeneous network of a macro cell and a small cell, which may be a next generation wireless communication system.

Referring to FIG. 12, a heterogeneous network environment is shown where a macro cell implemented by a conventional base station 200 is overlapped with a small cell implemented by one or more small base stations 300a, 300b, 300c, and 300d. Since the conventional base station provides a larger coverage than the small base station, it is called a macro base station (Macro eNodeB, MeNB). In the present disclosure, we will use the terms macro cell and macro base station. A UE connected to a macro cell 200 may be referred to as a macro UE. The macro UE receives the downlink signal from the macro base station and transmits the uplink signal to the macro base station.

In such a heterogeneous network, the coverage gap may be removed by configuring the macro cell as a primary cell (Pcell) and configuring the small cell as a secondary cell (Scell). In addition, the overall performance can be boosted by configuring the small cell as a primary cell (Pcell) and configuring the macro cell as a secondary cell (Scell).

Further, the small cell may use a frequency band allocated to LTE/LTE-A or use a higher frequency band (for example, a band of 3.5 GHz or higher).

Further, in the future LTE-A system, the small cell is not used independently, but is considered to be used as a macro-assisted small cell which may be used with the help of a macro cell.

Since these small cells 300a, 300b, 300c, and 300d have similar channel environments and are located at a distance close to each other, interference between the small cells may be a main problem.

In order to reduce the interference effect, the small cells 300b and 300c may extend or reduce their coverage. This extension and reduction of the coverage is called cell breathing. For example, as shown in the figure, the small cells 300b and 300c may be turned on or off depending on the situations.

Further, the small cell may use a frequency band assigned to LTE/LTE-A or use a higher frequency band (for example, a band of 3.5 GHz or higher).

<Introduction of Dual Connectivity>

Recently, a scheme for simultaneously connecting UE to different base stations, for example, a macro cell base station and a small cell base station is being studied. This is called dual connectivity.

Scenarios where the above-described dual connectivity is realized will be described with reference to FIG. 13a to FIG. 13d.

Figure 13A:
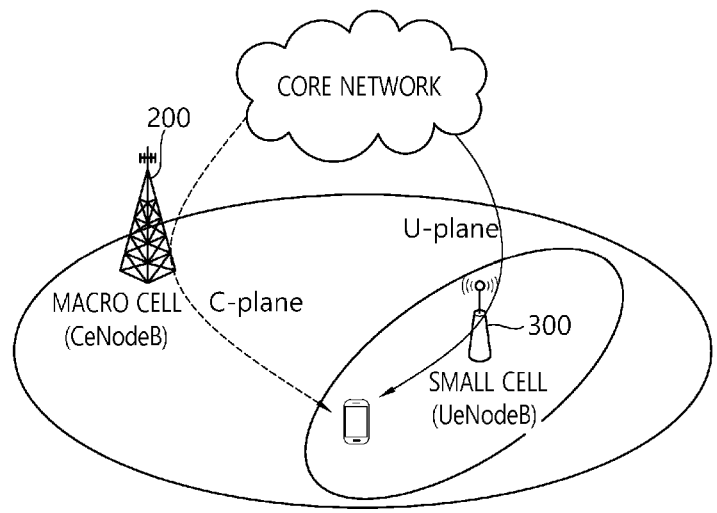
FIG. 13A and FIG. 13B shows scenarios where dual connectivity to macro cells and small cells is realized.
Figure 13B:
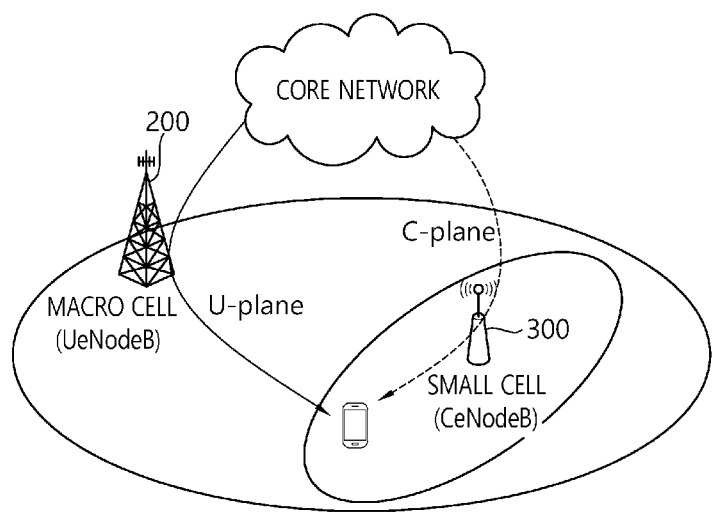

FIG. 13a and FIG. 13b shows scenarios where dual connectivity to macro cells and small cells is realized.

Referring to FIG. 13a, the UE may receive configuration such that a macro cell acts as a control plane (hereinafter referred to as a C-plane) and a small cell acts as a user plane (hereinafter referred to as a U-plane).

Referring to FIG. 13b, the UE may receive configuration such that a small cell acts as a C-plane and a macro cell act as a U-plane. For the convenience of the present disclosure, the C-Plane cell is called the C-Cell, and the U-Plane cell is called the U-Cell.

In this connection, the C-Plane is configured to support RRC connection configuration and reconfiguration, RRC idle mode, mobility including handover, cell selection and reselection, HARQ process, configuration and reconfiguration of carrier aggregation (CA), procedure for RRC configuration, and a random access procedure. The U-Plane is configured to support data processing by application, CSI reporting, HARQ processes for application data, and multicasting/broadcasting services.

From the viewpoint of UE, the configuration of C-plane and U-plane is as follows: the C-cell is configured as a primary cell, and the U-cell is configured as a secondary cell. Alternatively, conversely, a U-cell may be configured as a primary cell and a C-cell as a secondary cell. Alternatively, the C-Cell may be specially processed separately, and the U-Cell may be configured as a primary cell. Alternately, both C-Plane and U-Cell may be configured as primary cells. However, for the sake of convenience in the present disclosure, it is assumed that a C-cell is configured as a primary cell and a U-cell is configured as a secondary cell.

Further, in a situation where the UE 100 moves frequently over a short distance, handover may occur too often. To prevent this, for the UE, advantageously, the macro cell is configured as a C-cell or a primary cell, and the small cell is configured as a U-cell or a secondary cell.

For this reason, a macro cell may be always connected to the UE while acting as a primary cell for the UE.

In FIG. 13a and FIG. 13b, the UE is illustrated as being dual-connected to an eNodeB for a macro cell and an eNodeB for a small cell, but the present invention is not limited thereto. For example, the UE may be dual-connected to a first eNodeB for a first small cell (alternatively, a group of first small cells) and a second eNodeB for a second small cell (alternatively, a group of second small cells).

Considering all of the above examples, the eNodeB for the primary cell (Pcell) may be referred to as a master eNodeB (hereinafter referred to as MeNB). The eNodeB only for the secondary cell (Scell) may be referred to as a secondary eNodeB (hereinafter referred to as SeNB).

A cell group including a primary cell (Pcell) implemented by MeNB may be referred to as a master cell group (MCG or PUCCH cell group 1). A cell group including a secondary cell (Scell) implemented by the SeNB may be referred to as a secondary cell group (SCG or PUCCH cell group 2).

Among the secondary cells in the secondary cell group (SCG), a secondary cell in which the UE can transmit the UCI, or the secondary cell in which the UE can transmit the PUCCH may be referred to as a super secondary cell (Primary SCell) or a primary secondary cell (Primary Scell; PScell).

<Inefficiency of Measurement Gap (MG) in Carrier Aggregation (CA) and Dual Connectivity (DC)>

Conventionally, the base station provides only one measurement gap (MG) to the UE, assuming that the UE contains only one RF chain. However, while the UE has been improved to include more than one RF chains for carrier aggregation (CA) and dual connectivity (DC), the base station still provides only one measurement gap (MG) to the UE. If the base station only provides one measurement gap, the UE applies one measurement gap (MG) to the two or more RF chains. That is, the UE stops transmission and reception of UE with serving cells through all of the two or more RF chains during said one measurement gap period. The UE retunes only one of the two or more RF chains to be adapted to the inter-frequency, and then performs a measurement at the corresponding inter-frequency. In this way, even though the UE receives only one measurement gap (MG) and accordingly retunes one RF chain to be adapted to the inter-frequency, this is inefficient because the UE stops transmission and reception of UE with the serving cells through the all two or more RF chains.

Embodiments of the Present Disclosure

Therefore, the present disclosure proposes a method that may independently apply a measurement gap (MG) to each RF chain of the UE for efficient measurement of inter-frequency and inter-RAT. In order to independently apply the measurement gap (MG) to each RF chain of the UE, first, the base station needs to know the number of RF chains of the UE. To enable this, embodiments of the present disclosure may suggest utilizing information about the UE's carrier aggregation (CA) capability and dual connectivity (DC) capability.

Figure 14:
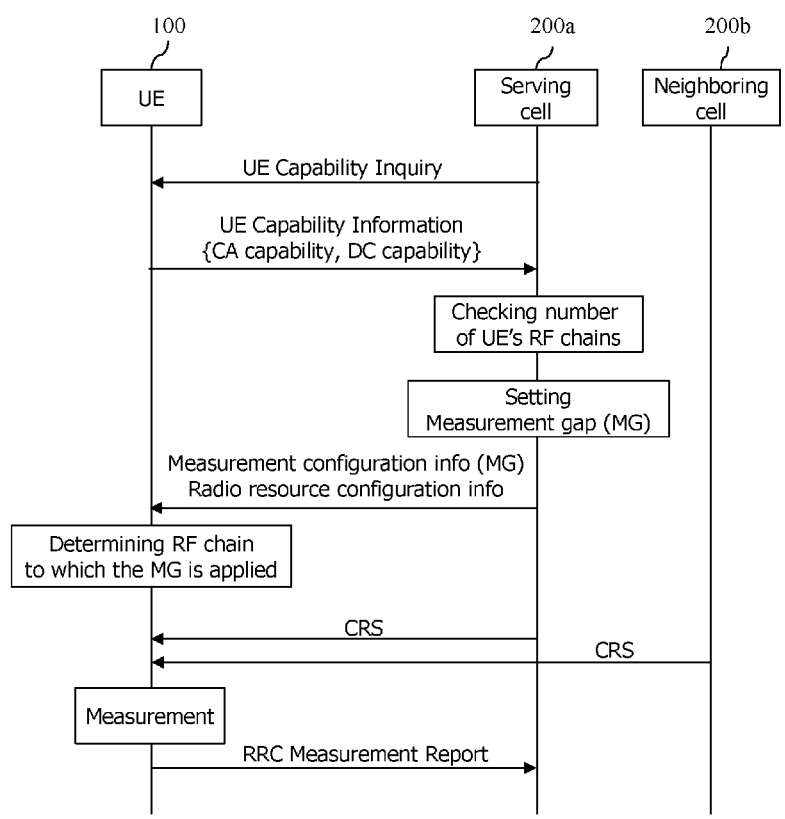
FIG. 14 is a signal flow diagram outlining an embodiment of the present disclosure.

FIG. 14 is a signal flow diagram outlining an embodiment of the present disclosure.

Referring to FIG. 14, the serving cell 200a requests the UE 100 to transmit UE capability thereto, based on an instruction from an upper layer or if necessary.

Then, the UE 100 transmits UE capability information to the serving cell 200a in a response to the request. In this connection, the UE capability information includes at least one of information on carrier aggregation (CA) capability and information on dual connectivity capability (DC capability).

Then, the serving cell 200a identifies the number of RF chains of the UE based on the carrier aggregation capability and the dual connectivity capability in the UE capability information. The serving cell 200a sets one or a plurality of measurement gap (MG) based on the identified number of RF chains of the UE.

Then, the base station transmits the measurement configuration information including information on the set measurement gap (MG) and radio resource configuration information to the UE.

Then, when the UE has a plurality of RF chains, the UE determines a carrier among a plurality of carriers for which a RF chain is associated with the measurement gap (MG).

Then, the UE performs measurement based on the measurement gap. Then, the UE transmits measurement report including the measurement result to the base station. In this connection, the measurement report may include an indication to indicate the carrier to which the UE has applied the measurement gap.

Hereinafter, a case where the UE has the carrier aggregation capability (CA capability) and a case where the UE has the dual connectivity capability (DC capability) will be separately described.

I. UE with Carrier Aggregation Capability (CA Capability)

When the UE informs the base station of the carrier aggregation capability (CA capability) and requires a measurement gap (MG) for measurement of inter-frequency and inter-RAT, the base station may provide one measurement gap or plural measurement gaps (MG) to the UE. When a plurality of the measurement gaps are transmitted, the number of the measurement gaps may be equal to or less than the number of component carriers by the carrier aggregation (CA). Then, the UE performs measurement using the measurement gap(s) (MG) received from the base station. In this connection, depending on whether the number of measurement gaps (MG) received from the base station is one or plural, the UE operates differently as follows.

I-1. When UE has Received One Measurement Gap (MG)

When the UE acquires one measurement gap (MG) from the base station, the UE determines whether said one measurement gap (MG) should be applied to the RF chain for PCC or Pcell, or the RF chain for SCC or Scell. Then, the UE may operate differently depending on the determination result. In this connection, upon determination that the measurement gap (MG) is applied to the RF chain for SCC or Scell, the UE may operate differently depending on whether the Scell is active or inactive. When said one measurement gap (MG) is applied only to one CC (that is, one cell) of the carrier aggregation (CA), it may be desirable for the UE to apply said one measurement gap (MG) to the RF chain for SCC, i.e. Scell, in order to preferentially guarantee transmission/reception with PCC (that is, transmission/reception with Pcell). However, it is not excluded for the UE to apply said one measurement gap (MG) to the RF chain for the PCC, that is, the Pcell. Hereinafter, both cases will be described.

I-1-1. When Measurement Gap (MG) is Applied to RF Chain for PCC (i.e., Pcell)

In this section, it is suggested that when the UE receives one measurement gap (MG), the UE applies said one measurement gap (MG) to the RF chain responsible for the PCC, that is, the Pcell, and UE does not apply the MG to the RF chain responsible for the SCC, that is, the Scell. In this connection, depending on whether the Scell is active or inactive, the UE may operate differently as follows:

i) When Scell is Active

Figure 15:
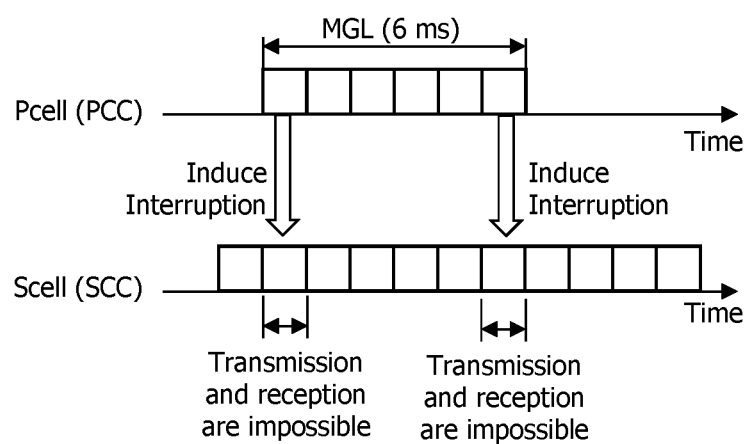
FIG. 15 shows the case where the measurement gap (MG) is applied to the RF chain for PCC that is, Pcell, and the scell is active.

In case that the UE includes only one RF chain, the UE retunes the RF chain to change the frequency of the PCC, thereby to cause transmission and reception of UE with the active Scell to be interrupted. With reference to FIG. 15, this will be described.

FIG. 15 shows the case where the measurement gap (MG) is applied to the RF chain for PCC that is, Pcell, and the scell is active.

Referring to FIG. 15, the interruption period may be expressed on a subframe basis. Specifically, when the measurement gap length (MGL) is 6 ms, that is, 6 subframes, transmission/reception with the Scell is interrupted on a first subframe and a last subframe, but it is possible for the UE to transmit and receive with the Scell only on middle 4 subframes (4 ms). Conventionally, however, transmission and reception of UE with the Pcell and transmission and reception of UE with the Scell are interrupted over the measurement gap length (MGL). Therefore, in contrast to the conventional case, the performance may be improved in accordance with the present disclosure.

ii) When Scell is Inactive

As described above, when the RF chain is returned by the UE to change the frequency of the PCC, transmission and reception of UE with the Scell are interrupted on the first subframe and the last subframe among the six subframes, corresponding to the measurement gap length (MGL). Further, as described above, the measurement for the inactive Scell is performed every cycle indicated by measCycleScell. This will be described with reference to FIG. 16A and FIG. 16B.

Figure 16A:
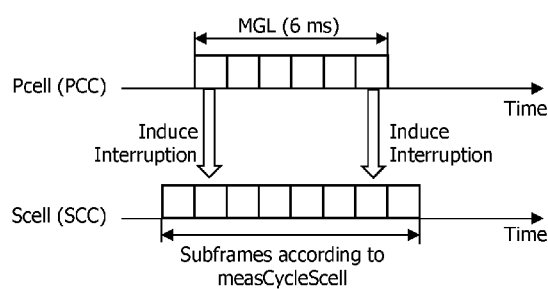
FIG. 16A and FIG. 16B show the case where the measurement gap (MG) is applied to the RF chain for PCC that is, Pcell, and the Scell is in the inactive state.
Figure 16B:
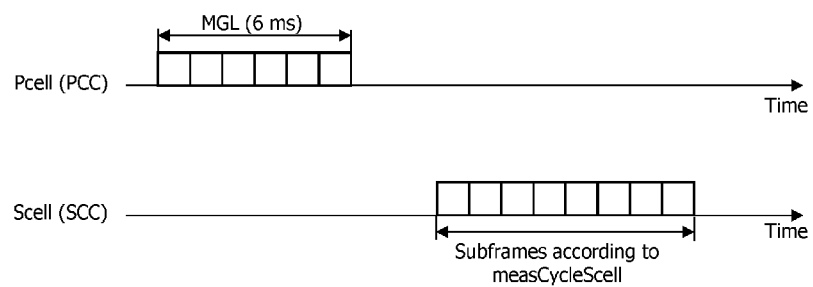

FIG. 16A and FIG. 16B show the case where the measurement gap (MG) is applied to the RF chain for PCC that is, Pcell, and the Scell is in the inactive state.

Referring to FIG. 16A, when the first subframe and the last subframe in which transmission and reception of UE with the Scell is interrupted overlap with the subframe on which measurement should be performed, as indicated by measCycleScell, there is a problem that the measurement cannot be performed. Therefore, it is proposed by an embodiment of the present disclosure that the base station configure measCycleScell and parameters, for example, MGL, related to the measurement gap (MG) so that the overlap does not occur as much as possible, as shown in FIG. 16B. Alternatively, when the base station fails to prevent the occurrence of the overlap, the UE may not perform the measurement of the inactive Scell on the overlapped subframe.

I-1-2. When Measurement Gap (MG) is Applied to RF Chain for SCC (i.e., Scell)

In this section, it is suggested that when the UE receives one measurement gap (MG), the UE applies one measurement gap (MG) to the RF chain responsible for the SCC, that is, the S cell, and UE does not apply the MG to the RF chain responsible for the PCC, that is, the Pcell. In this connection, depending on whether the Scell is active or inactive, the UE may operate differently as follows:

i) When Scell is Active

When the UE retunes the RF chain to change the frequency of the SCC, and when the measurement gap length (MGL) is 6 ms, that is, 6 subframes, transmission/reception with the Pcell is interrupted on a first subframe and a last subframe, but it is possible for the UE to transmit and receive with the Pcell on middle 4 subframes (4 ms). Conventionally, however, transmission and reception of UE with the Pcell and transmission and reception of UE with the Scell are interrupted over the measurement gap length (MGL). Therefore, in contrast to the conventional case, the performance may be improved in accordance with the present disclosure.

i) When Scell is Inactive

Figure 17A:
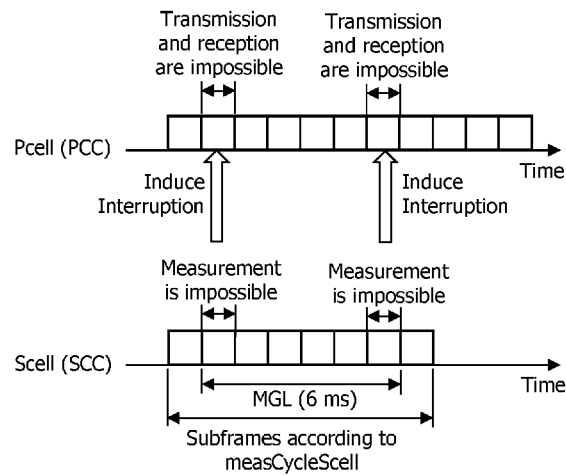
FIG. 17A and FIG. 17B show the case where the measurement gap (MG) is applied to the RF chain for SCC that is, Scell, and Scell is in the inactive state.
Figure 17B:
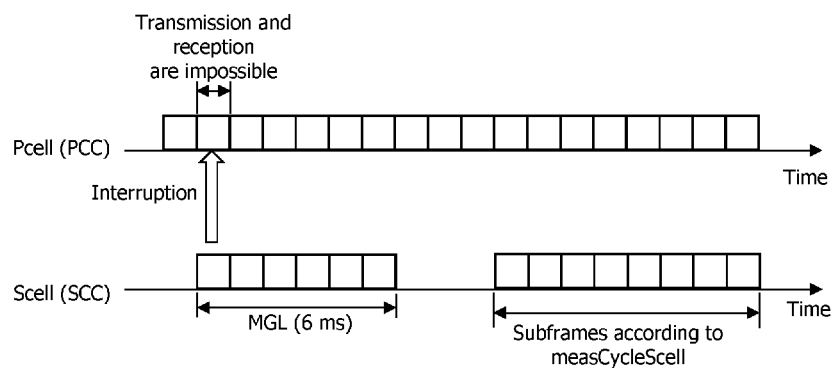

FIG. 17A and FIG. 17B show the case where the measurement gap (MG) is applied to the RF chain for SCC that is, Scell, and Scell is in the inactive state.

Referring to FIG. 17A, when the UE retunes the RF chain to change the frequency of the SCC, the first subframe and the last subframe in which transmission and reception is interrupted overlap with the subframe on which measurement should be performed, as indicated by measCycleScell, there is a problem that the measurement cannot be performed. Therefore, it is proposed by an embodiment of the present disclosure that the base station configure measCycleScell and parameters, for example, MGL, related to the measurement gap (MG) so that the overlap does not occur as much as possible, as shown in FIG. 17B.

Further, transmission/reception with the Pcell is interrupted in the first subframe and the last subframe among the six subframes corresponding to the measurement gap length (MGL), but transmission/reception with the Pcell may be performed on the middle 4 subframes that is, 4 ms. Conventionally, however, transmission and reception of UE with the Pcell and transmission and reception of UE with the S cell are interrupted for the measurement gap length (MGL). Therefore, compared to the conventional case, the performance may be improved in the embodiment. To further improve performance, it may be suggested to perform RF retuning to the inter-frequency on the first subframe among the six subframes corresponding to the measurement gap length (MGL), but not to perform RF retuning to the frequency of the inactive S cell on the last subframe. As a result, it is possible to transmit/receive data to/from the Pcell on the five subframes that is 5 ms long.

I-2. When the UE Receives a Plurality of Measurement Gaps (MG)

In this section, the applicants propose that the base station provides the measurement gaps (MGs) to the UE respectively for PCC and SCC. In this case, the number (for example, N) of measurement gaps (MGs) may be provided for the SCC. The provision of a plurality (for example, N) of measurement gap (MG) parameters to the UE means that the UE has the capability to perform inter-frequency and inter-RAT measurements at the same time. In this connection, the larger the N is, the more complex the implementation and the higher the power consumption, in order for the UE to perform the measurements correctly. As an alternative, the larger N is, the smaller the measurement time (including cell identification delay and measurement period) is. For example, if N=2, the time to perform measurements for inter-frequency and inter-RAT is reduced from the normal base time multiplication factor Nfreq to Nfreq/2. As a result, the appropriate N value must be configured, taking into the account implementation complexity, power consumption, and measurement time. In this section, this example considers one PCC and one SCC for the carrier aggregation (CA), and proposes N=2, with considering the UE's implementation complexity and power consumption. That is, if the number of the SCCs is greater than or equal to 2, the UE may apply two independent measurement gap (MG) parameters to one PCC and one SCC respectively, or apply two independent measurement gap (MG) parameters to two SCCs respectively. This case corresponds to the case where the UE has multiple RF chains for carrier aggregation. For example, it may be envisioned that, in the case of one PCC and one SCC, PCC and SCC are transmitted and received through different RF chains, while, in case of two SCCs (the measurement gap (MG) is not applied to the PCC), two SCCs are transmitted and received via different RF chains. As an alternative, when carrier aggregation is supported with one RF chain (in case of intra-band contiguous CA), one measurement gap (MG) is applied according to the above section I-1 without applying multiple measurement gaps. In case of three or more than CCs (one PCC, two or more SCCs), when the UE sends and receives data with one PCC and two SCCs via different RF chains, the applicants propose that two measurement gaps (MG) are applied preferentially to the two SCCs respectively in order to maximize transmission and reception performance of UE with the Pcell. However, this approach does not exclude the application of a measurement gap (MG) to one PCC.

I-2-1. When Different Measurement Gaps (MG) are Applied to PCC and SCC Respectively The base station recognizes, based on the CA capability received from the UE, that the UE transmits and receives the PCC and the SCC through different RF chains, and, then, provides multiple measurement gaps (MGs) to the UE. The UE may then apply separate measurement gaps (MGs) to the RF chain for the PCC and the RF chain for the SCC respectively. For example, if two measurement gaps (MGs), for example, MG_Pcell and MG_Scell are provided, the UE may apply the MG_Pcell to the RF chain for the Pcell and apply the MG_Scell to the RF chain for the Scell. In this case, transmission/reception with the Pcell is restricted during the measurement gap length, that is, MGL_pcell for the Pcell. Further, transmission/reception with the Pcell is interrupted at the first and last subframes of the measurement gap length, that is, MGL_Scell period for the Scell. The interruption period (that is, the number of subframes) may vary according to the configuration (gap pattern ID, offset) of MG_Pcell and MG_scell. Specifically, this will be described with reference to the drawings.

FIG. 18A to FIG. 18E shows examples of applying different measurement gaps (MGs) to PCC and SCC.

First, if the gap pattern ID of MG_Pcell and the gap pattern ID of MG_Scell are identically configured, and if the offset of MG_Pcell and the offset of MG_Scell are identically configured, the transmission/reception with the Pcell is not interrupted during the measurement gap length, that is, the MGL_Scell for the Scell. Specifically, as shown FIG. 18A, if the gap pattern ID of MG_Pcell and the gap pattern ID of MG_Scell both are configured as 0, MGRP for Pcell and MGRP for Scell are equal to each other as 40 ms. In this connection, if the offsets thereof are also configured as the same value, the measurement gap length for the Pcell, that is, MGL_Pcell, and the measurement gap length for the Scell, that is, MGL_Scell are equal to each other. Therefore, over the measurement gap length (MGL) at the same time position, the RF chain for Pcell and the RF chain for Scell perform inter-frequency measurements, thus not causing mutual transmission/reception interruption.

Figure 18A:
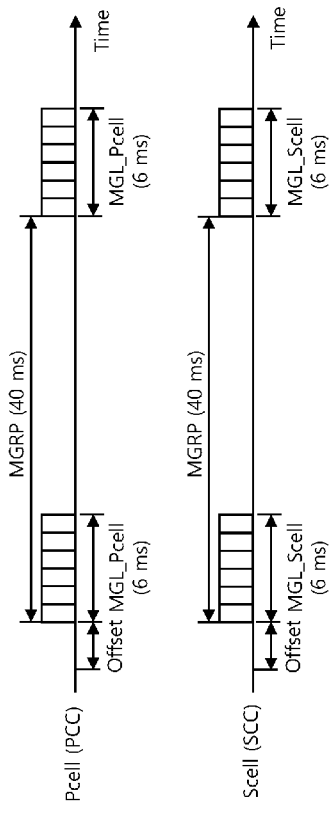
FIG. 18A to FIG. 18E shows examples of applying different measurement gaps (MGs) to PCC and SCC.
Figure 18B:
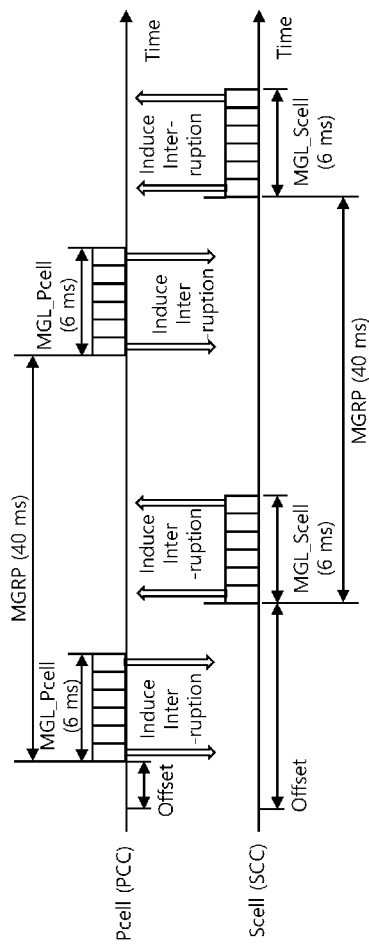

As an alternative, when the gap pattern ID of MG_Pcell and the gap pattern ID of MG_Scell are configured to be the same, and when the offset of MG_Pcell and the offset of MG_Scell are configured to be different by 6 ms or more, transmission and reception of UE with the Pcell are interrupted during the measurement gap length, that is, MGL_Scell for the Scell. This interruption occurs for two subframes. Likewise, during the measurement gap length for Pcell, that is, MGL_Pcell, transmission and reception of UE with the Scell are interrupted. The interruption occurs for two subframes. Specifically, as shown in FIG. 18B, if both the gap pattern ID of MG_Pcell and the gap pattern ID of MG_Scell are identically configured to be 0, the MGRP for the Pcell and the MGRP for the scell are equal to each other as 40 ms.

However, if offsets thereof are configured to be different by more than or equal to 6 ms, the interruption occurs.

Figure 18C:
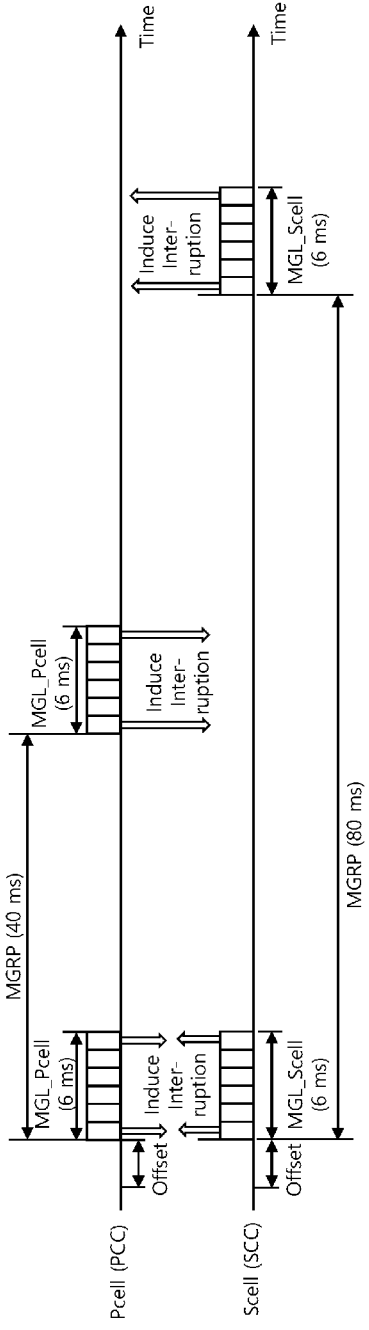

As an alternative, when the gap pattern ID of MG_Pcell is set to 0, while the gap pattern ID of MG_Scell is set to 1, and, if the offset of MG_Pcell and the offset of MG_Scell are configured to be equal to each other, transmission and reception of UE with the Pcell are not interrupted during the measurement gap length, that is, MGL_Scell for the Scell. During the measurement gap length for Pcell, that is, MGL_Pcell, transmission and reception of UE with the Scell are interrupted. The interruption occurs for two subframes every 80 ms. Specifically, as shown in FIG. 18C, if the gap pattern ID of MG_Pcell is configured as 0, MGRP becomes 40 ms, while if the gap pattern ID of MG_Scell is configured as 1, MGRP becomes 80 ms. In this connection, even when the offset of MG_Pcell and the offset of MG_Scell are configured to be equal to each other, interruption occurs.

Figure 18D:
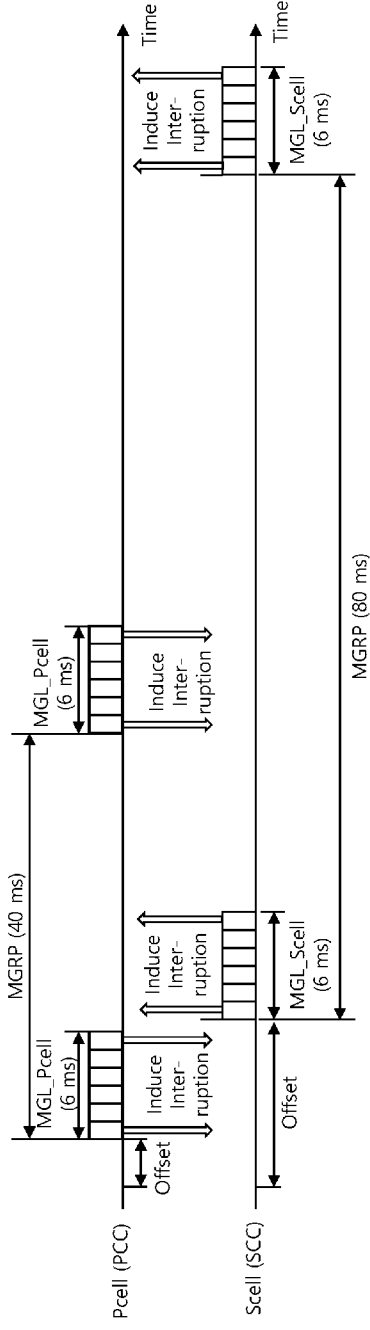

As a further alternative, when the gap pattern ID of MG_Pcell is set to 0, while the gap pattern ID of MG_Scell is set to 1, and, if the offset of MG_Pcell and the offset of MG_Scell are configured to be different by 6 ms or more, transmission and reception of UE with the Pcell are not interrupted during the measurement gap length, that is, MGL_Scell for the Scell. The interruption occurs for two subframes every 80 ms. During the measurement gap length for Pcell, that is, MGL_Pcell, transmission and reception of UE with the Scell are interrupted. The interruption occurs for two subframes every 40 ms. Specifically, as shown in FIG. 18D, if the gap pattern ID of the MG_Pcell is configured as 0, the MGRP becomes 40 ms. If the gap pattern ID of the MG_Scell is configured as 1, the MGRP becomes 80 ms. In this connection, when the offset of MG_Pcell and the offset of MG_Scell are configured to be different from each other by more than or equal to 6 ms, interruption occurs.

Therefore, in order to minimize the interruption, the base station configures the offsets so that the two measurement gap lengths (MGLs) overlap as much as possible.

I) When Scell is Active

The performance of the UE for the Pcell is equal to or smaller than that in the conventional case. The performance of the UE for the Pcell is equal to that in the conventional case, when the gap pattern ID of MG_Pcell and the gap pattern ID of MG_Scell are the same, or when the gap pattern ID of MG_Pcell is set to 0 and the gap pattern ID of MG_Scell is set to 1, and the offset of MG_Pcell and the offset of MG_Scell are configured identically. In other cases than the above cases, the performance of the UE for the Pcell is smaller than that in the conventional case, since the transmission and reception of UE with the Pcell is interrupted during the measurement gap length (MGL) for the Scell.

The performance of the UE for the Scell is equal to or smaller than that in the conventional case. The performance of the UE for the S cell is equal to that in the conventional case, when the gap pattern ID of MG_Pcell and the gap pattern ID of MG_Scell are configured to be the same, or when the gap pattern ID of MG_Pcell is set to 1 and the gap pattern ID of MG_Scell is set to 0, and the offset of MG_Pcell and the offset of MG_Scell are configured identically. In other cases than the above cases, the performance of the UE for the Scell is smaller than that in the conventional case, since the transmission and reception of UE with the Scell is interrupted during the measurement gap length (MGL) for the Pcell.

Therefore, in this section, it is proposed to configure the offset of MG_Pcell and the offset of MG_Scell to be equal to each other to minimize the effect of interruption.

ii) When Scell is Inactive

The performance of the UE for the Pcell is equal to or smaller than that in the conventional case. The performance of the UE for the Pcell is equal to that in the conventional case, when the gap pattern ID of MG_Pcell and the gap pattern ID of MG_Scell are the same, or when the gap pattern ID of MG_Pcell is set to 0 and the gap pattern ID of MG_Scell is set to 1, and the offset of MG_Pcell and the offset of MG_Scell are configured identically. In other cases than the above cases, the performance of the UE for the Pcell is smaller than that in the conventional case, since the transmission and reception of UE with the Pcell is interrupted during the measurement gap length (MGL) for the Scell.

Figure 18E:
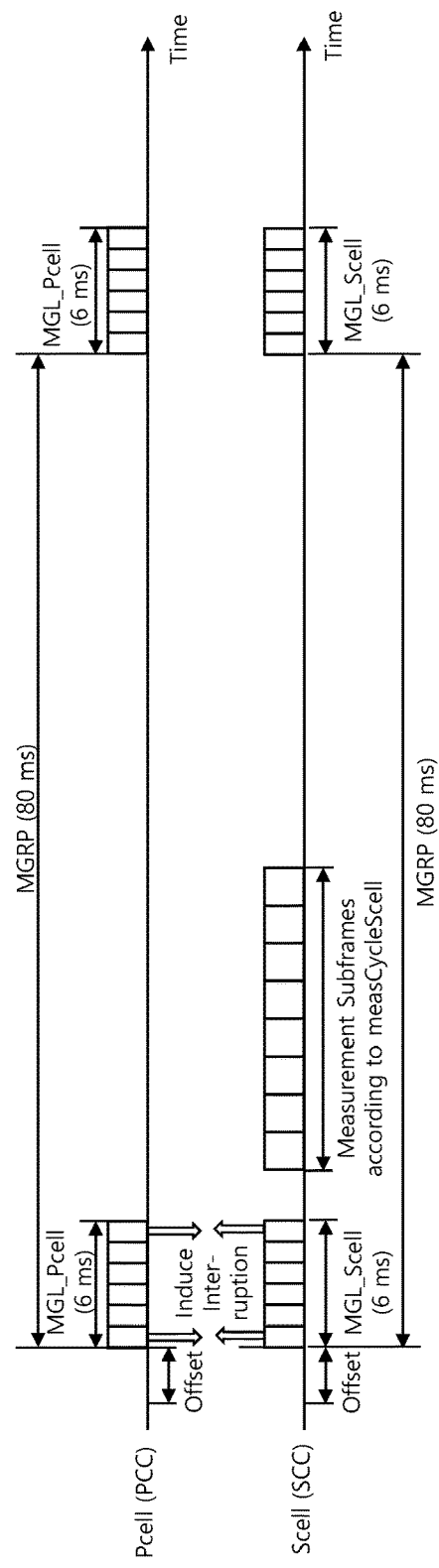

Measurement for an inactive Scell is performed every cycle indicated by measCycleScell. It is suggested that if the subframe on which the measurement is to be performed for the inactive Scell, based on the cycle indicated by the measCycleScell overlaps with the measurement gap length, that is, MGL_Scell, the UE performs only inter-frequency and inter-RAT measurement on the overlapping subframe. Ideally, it may be suggested that the base station should configure the offsets such that the subframe on which the measurement on the inactive Scell is to be performed based on the cycle indicated by measCycleScell should not overlap the measurement gap length that is, MGL_Scell. If a subframe on which the measurement for the inactive Scell is not performed is overlapped with the measurement gap length that is MGL_Scell, the UE may perform measurements of inter-frequency and inter-RAT, on the subframes where the measurement is not performed for the inactive Scell, regardless of the position of the measurement gap length, that is, MGL_Scell. However, since this may cause an interruption with transmission and reception of UE with the Pcell, this paragraph of the present disclosure proposes that the UE performs measurements of the inter-frequency and inter-RAT only during the measurement gap length, that is, MGL_Scell. Further, in order to minimize the effect of additional interruptions, this paragraph of the present disclosure proposes, as shown in FIG. 18E, that the base station configures the offset of MG_Pcell and the offset of MG_Scell to be equal to each other. Further, this paragraph of the present disclosure proposes, as shown in FIG. 18e, that the base station configures the offsets such that the subframe on which the measurement for the inactive Scell is to be performed based on the cycle indicated by measCycleScell is not overlapped with the measurement gap length, that is, MGL_Scell.

I-2-2. When Applying Different Measurement Gaps (MGs) to Multiple SCCs Respectively The base station recognizes that the UE uses the first RF chain for the PCC and first SCC and the second RF chain for the second SCC, based on the CA capability received from the UE, and, then, UE provides a plurality of measurement gaps (MGs) to the UE. The UE may apply different measurement gaps (MGs) to the RF chains for SCCs, respectively. For example, if the base station provides two measurement gaps (MGs), for example, MG_Scell #1 and MG_Scell #2, the UE applies MG_Scell #1 to the RF chain for Scell #1, and to apply MG_Scell #2 to the RF chain for Scell #2. In this case, transmission/reception with Scell #1 is restricted during the measurement gap length, that is, MGL_Scell #1. In addition, transmission/reception with the Scell #1 is interrupted on the first and last subframes of the measurement gap length, that is, MGL_Scell #2 period for the Scell #2. The interruption period (that is, the number of subframes) may be vary based on the configurations (gap patterns IDs, offsets) of MG_Scell #1 and MG_Scell #2.

More specifically, when the gap pattern ID of MG_Scell #1 and the gap pattern ID of MC_Scell #2 are configured identically, and when the offset of the MG_Scell #1 and the offset of the MG_Scell #2 are configured to be the same, transmission and reception of UE with the Scell #1 are not interrupted during the measurement gap length, that is, MGL_Scell #2 for the Scell #2. When the gap pattern ID of MG_Scell #1 and the gap pattern ID of MC_Scell #2 are configured to be the same, and when the offset of MG_Scell #1 and the offset of MG_Scell #2 are configured to be different from each other by 6 ms or more, transmission and reception of UE with Scell #1 are interrupted during the measurement gap length, that is, for MGL_Scell #2 for Scell #2. The interruption occurs for two subframes. In addition, during measurement gap length, that is, for MGL_Scell #1 for Scell #1, transmission and reception to and from Scell #2 are also interrupted. The interruption occurs for two subframes.

When the gap pattern ID of MG_Scell #1 is set to 0, the gap pattern ID of MG_Scell #2 is set to 1, and if the offset of MG_Scell #1 and the offset of MG_Scell #2 are configured to be the same, transmission and reception of UE with Scell #1 are not subjected to interruption, during the measurement gap length, that is, for MGL_Scell #2 for Scell #2. During measurement gap length, that is, for MGL_Scell #1 for Scell #1, transmission and reception of UE with Scell #2 may be interrupted. The interruption occurs for two subframes every 80 ms.

When the gap pattern ID of MG_Scell #1 is configured to be 0, and the gap pattern ID of MG_Scell #2 is configured to 1, and if the offset of MG_Scell #1 and the offset of MG_Scell #2 are configured to differ from each other by 6 ms or more, transmission and reception of UE with Scell #1 are interrupted during the measurement gap length, that is, for MGL_Scell #2 for Scell #2. The interruption occurs for two subframes every 80 ms. Further, during measurement gap length, that is, for MGL_Scell #1 for Scell #1, transmission and reception of UE with Scell #2 are also interrupted. The interruption occurs for two subframes every 40 ms.

In order to minimize such interruption, in accordance with this section of the present disclosure, the base station configures the offset of MG_Scell #1 and the offset of MG_Scell #2 such that the measurement gap length MGL_Scell #1 of the MG_Scell #1 and the measurement gap length MGL_Scell #2 of the MG_Scell #2 overlap each other as much as possible.

Conventionally, transmission and reception of UE with the Pcell are interrupted during the measurement gap length (MGL) of 6 ms. However, according to the present disclosure, transmission and reception of UE with the Pcell are interrupted only during two measurement gap lengths, that is, MGL_Scell #1 and MGL_Scell #2. If the gap pattern ID of MG_Scell #1 and the gap pattern ID of MG_Scell #2 are configured to be the same, and the offset of MG_Scell #1 and the offset of MG_Scell #2 are configured to be the same, the interruption period may be minimized such that the interruption occurs only on 2 subframes, that is, 2 ms. Alternatively, if the gap pattern ID of the MG_Scell #1 and the gap pattern ID of the MG_Scell #2 are configured to be the same, and the offset of the MG_Scell #1 and the offset of the MG_Scell #2 are configured to differ from each other by 6 ms or more, the interruption occurs for 4 subframes, that is, 4 ms. Nevertheless, as compared to the prior art where transmission and reception were interrupted for 6 ms, the smaller interruption period may be achieved according to the present disclosure. Thus, there is a benefit in terms of performance of UE for the Pcell. Thus, when measurement gaps (MG) are respectively applied to different RF chains for SCCs, the transmission/reception performance of the UE with the Pcell may be improved. Therefore, in accordance with this section of the present disclosure, it is proposed that when the UE supports each RF chain for each CC, the UE applies preferentially the plurality of measurement gaps (MGs) to the RF chains for the SCCs respectively.

i) When Both Scell#1 and Scell#2 are Active

The transmission/reception performance of the UE with the Pcell is equal to or greater than that in the conventional case. The transmission/reception performance of the UE with the Scell#1 is equal to or smaller than that in the conventional case. The transmission/reception performance of the UE with the Scell#1 is equal to that in the conventional case, when the gap pattern IDs of MG_Scell#1 and MG_Scell#2 are configured to be equal to each other, or the gap pattern ID of MG_Scell#1 is set to 0 and the gap pattern ID of MG_Scell#2 is set to 1, and the offset of MG_Scell#1 and the offset of MG_Scell#2 are configured to be equal to each other. In other cases than the above-defined cases, the transmission/reception performance of the UE with the Scell#1 is smaller than that in the conventional case, since transmission/reception with Scell#1 is interrupted during the measurement gap length MGL_Scell#2 for Scell#2.

The transmission/reception performance of the UE with the Scell#2 is equal to or smaller than that in the conventional case. The transmission/reception performance of the UE with the Scell#2 is equal to that in the conventional case, when the gap pattern IDs of MG_Scell#1 and MG_Scell#2 are configured to be equal to each other, or the gap pattern ID of MG_Scell#1 is set to 1 and the gap pattern ID of MG_Scell#2 is set to 0, and the offset of MG_Scell#1 and the offset of MG_Scell#2 are configured to be equal to each other. In other cases than the above-defined cases, the transmission/reception performance of the UE with the Scell#2 is smaller than that in the conventional case, since transmission/reception with Scell#2 is interrupted during the measurement gap length MGL_Scell#2 for Scell#1. Therefore, in accordance with this paragraph of the present disclosure, in order to minimize interruption effects, the base station configures the offset of the MG_Scell#1 and the offset of the MG_Scell#2 to be equal to each other.

ii) When Scell#1 is Active, but Scell#2 is Inactive

The transmission/reception performance of the UE with the Pcell is equal to or greater than that in the conventional case. The transmission/reception performance of the UE with the Scell#1 is equal to or smaller than that in the conventional case. The transmission/reception performance of the UE with the Scell#1 is equal to that in the conventional case, when the gap pattern IDs of MG_Scell#1 and MG_Scell#2 are configured to be equal to each other, or the gap pattern ID of MG_Scell#1 is set to 0 and the gap pattern ID of MG_Scell#2 is set to 1, and the offset of MG_Scell#1 and the offset of MG_Scell#2 are configured to be equal to each other. In other cases than the above-defined cases, the transmission/reception performance of the UE with the Scell#1 is smaller than that in the conventional case, since transmission/reception with Scell#1 is interrupted during the measurement gap length MGL_Scell#2 for Scell#2.

Further, as mentioned above, measurement for an inactive Scell#2 is performed every cycle indicated by measCycleScell. It is suggested that if the subframe on which the measurement is to be performed for the inactive Scell#2, based on the cycle indicated by the measCycleScell overlaps with the measurement gap length, that is, MGL_Scell#2, the UE performs only inter-frequency and inter-RAT measurement on the overlapping subframe. Ideally, it may be suggested that the base station should configure the offsets such that the subframe on which the measurement on the inactive Scell#2 is to be performed based on the cycle indicated by measCycleScell should not overlap the measurement gap length that is, MGL_Scell#2. If a subframe on which the measurement for the inactive Scell#2 is not performed is overlapped with the measurement gap length that is MGL_Scell#2, the UE may perform measurements of inter-frequency and inter-RAT, on the subframe where the measurement is not performed for the inactive Scell#2, regardless of the position of the measurement gap length, that is, MGL_Scell#2. However, since this may cause an interruption with transmission and reception of UE with the Pcell and with transmission and reception of UE with the Scell#1, this paragraph of the present disclosure proposes that the UE performs measurements of the inter-frequency and inter-RAT only during the measurement gap length, that is, MGL_Scell#2. Further, in order to minimize the effect of additional interruptions, this paragraph of the present disclosure proposes that the base station configures the offsets of the corresponding cells to be equal to each other.

iii) When Scell#2 is Active, but Scell#1 is Inactive

The transmission/reception performance of the UE with the Pcell is equal to or greater than that in the conventional case. The transmission/reception performance of the UE with the Scell#2 is equal to or smaller than that in the conventional case. The transmission/reception performance of the UE with the Scell#2 is equal to that in the conventional case, when the gap pattern IDs of MG_Scell#2 and MG_Scell#1 are configured to be equal to each other, or the gap pattern ID of MG_Scell#2 is set to 0 and the gap pattern ID of MG_Scell#1 is set to 1, and the offset of MG_Scell#2 and the offset of MG_Scell#1 are configured to be equal to each other. In other cases than the above-defined cases, the transmission/reception performance of the UE with the Scell#2 is smaller than that in the conventional case, since transmission/reception with Scell#2 is interrupted during the measurement gap length MGL_Scell#1 for Scell#1.

Further, as mentioned above, measurement for an inactive Scell#1 is performed every cycle indicated by measCycleScell. It is suggested that if the subframe on which the measurement is to be performed for the inactive Scell#1, based on the cycle indicated by the measCycleScell overlaps with the measurement gap length, that is, MGL_Scell#1, the UE performs only inter-frequency and inter-RAT measurement on the overlapping subframe. Ideally, it may be suggested that the base station should configure the offsets such that the subframe on which the measurement on the inactive Scell#1 is to be performed based on the cycle indicated by measCycleScell should not overlap the measurement gap length that is, MGL_Scell#1. If a subframe on which the measurement for the inactive Scell#1 is not performed is overlapped with the measurement gap length that is MGL_Scell#1, the UE may perform measurements of inter-frequency and inter-RAT, on the subframe where the measurement is not performed for the inactive Scell#1, regardless of the position of the measurement gap length, that is, MGL_Scell#1. However, since this may cause an interruption with transmission and reception of UE with the Pcell and with transmission and reception of UE with the Scell#2, this paragraph of the present disclosure proposes that the UE performs measurements of the inter-frequency and inter-RAT only during the measurement gap length, that is, MGL_Scell#1. Further, in order to minimize the effect of additional interruptions, this paragraph of the present disclosure proposes that the base station configures the offsets of the corresponding cells to be equal to each other.

iv) When Scell#1 is Inactive, and Scell#2 is Inactive

The transmission/reception performance of the UE with the Pcell is equal to or greater than that in the conventional case.

Further, as mentioned above, measurement for an inactive Scell#1 is performed every cycle indicated by measCycleScell. It is suggested that if the subframe on which the measurement is to be performed for the inactive Scell#1, based on the cycle indicated by the measCycleScell overlaps with the measurement gap length, that is, MGL_Scell#1, the UE performs only inter-frequency and inter-RAT measurement on the overlapping subframe. Ideally, it may be suggested that the base station should configure the offsets such that the subframe on which the measurement on the inactive Scell#1 is to be performed based on the cycle indicated by measCycleScell should not overlap the measurement gap length that is, MGL_Scell#1. If a subframe on which the measurement for the inactive Scell#1 is not performed is overlapped with the measurement gap length that is MGL_Scell#1, the UE may perform measurements of inter-frequency and inter-RAT, on the subframe where the measurement is not performed for the inactive Scell#1, regardless of the position of the measurement gap length, that is, MGL_Scell#1. However, since this may cause an interruption with transmission and reception of UE with the Pcell, this paragraph of the present disclosure proposes that the UE performs measurements of the inter-frequency and inter-RAT only during the measurement gap length, that is, MGL_Scell#1.

Further, as mentioned above, measurement for an inactive Scell#2 is performed every cycle indicated by measCycleScell. In this same manner as described with reference to inactive Scell#1, it is suggested that if the subframe on which the measurement is to be performed for the inactive Scell#2, based on the cycle indicated by the measCycleScell overlaps with the measurement gap length, that is, MGL_Scell#2, the UE performs only inter-frequency and inter-RAT measurement on the overlapping subframe. Further descriptions as for inactive Scell#2 may be same as described with reference to inactive Scell#1.

II. UE with Dual Connectivity Capability (DC Capability)

If the UE informs the base station of the UE's dual connectivity capability (DC capability) and requests the base station of the measurement gap (MG) for measurements for inter-frequency and inter-RAT, the base station configures one measurement gap (MG) or a number of measurement gaps (MGs) equal to or smaller than the number of carriers for the dual connectivity (DC) and delivers the MG(s) to the UE. Then, the UE uses the measurement gaps (MGs) received from the base station to identify and measure the cells using inter-frequency and inter-RAT. Conventionally, the base station provides only one measurement gap (MG) to the UE, and the UE performs measurements using only one measurement gap (MG).

In this connection, during the measurement gap length (MGL), transmission and reception of UE with the Pcell of the UE is suppressed. Further, when the dual connectivity (DC) is synchronous, the transmission and reception of UE with the PScell are interrupted during the measurement gap length (MGL). In the case of dual connectivity (DC) being asynchronous, transmission and reception of UE with the PScell are interrupted for the entire period 1 ms (that is, one subframe) longer than the measurement gap length (MGL). To the contrary, according to the present disclosure, by applying different measurement gaps (MGs) to the Pcell and the PScell, transmission and reception of UE with the PScell are stopped only for 6 ms which is the measurement gap length (MGL), even when dual connectivity (DC) is asynchronous. This results in a gain of 1 ms, that is, one subframe, compared to the conventional case.

II-1. When Applying Multiple Measurement Gaps (MGs).

The base station independently configures the measurement gaps (MGs) for the RF chain for the Pcell and the RF chain for the PScell, and provides the independently-configured MGs to the UE. The present disclosure proposes that the UE perform measurements for inter-frequency and inter-RAT accordingly. In this case, the UE may apply two independent measurement gaps (MGs) to the Pcell and PScell, respectively. If the UE supports carrier aggregation (CA) in addition to dual connectivity (DC), the measurement gaps (MGs) for Pcell, Scell, or PScell and Scell may comply with those in the previous chapter I.

In accordance with the present disclosure, it may be suggested that, when the UE has both DC capability and CA capability, and, further, the UE performs transmissions and receptions with the Pcell, PScell, and Scell through separate RF chains respectively, and, moreover, when the UE receives a plurality of measurement gaps (MGs), for the overall transmission/reception performance gain of the UE with the Pcell or PScell, the UE preferentially applies one measurement gap to the RF chain for Scell, and the UE next-preferentially applies the remaining measurement gaps (MGs) to the RF chain for Pcell or PScell.

The base station recognizes, based on the DC capability received from the UE, that the UE performs transmissions and receptions with the Pcell and the PScell via different RF chains, and then configures a plurality of measurement gaps (MGs). In this response, UE may apply the independent measurement gaps (MGs) to the RF chains for Pcell and the PScell. For example, it is suggested that when two measurement gap (MG), that is, MG_Pcell for Pcell, MG_PScell for PScell are independently configured, the base station should configure the offsets so that the positions of both measurement gap lengths (MGLs) overlap with each other in order to minimize interruption between the Pcell and the PScell.

II-1-1. When, in Synchronous Dual Connectivity (DC) Mode, Independent Measurement Gaps (MGs) are Applied to Pcell and PScell Transmission and reception of UE with the Pcell are interrupted during the measurement gap length, that is, MGL_Pcell for the Pcell. In addition, transmission and reception of UE with the Pcell are further interrupted on the first and last subframes of the measurement gap length, that is, MGL_PScell period for the PScell. This interruption period may vary depending on the gap pattern ID and offset of the measurement gap (MG). This will be described in detail as follows.

If the gap pattern ID of the MG_Pcell and the gap pattern ID of the MG_PScell are configured to be the same, and the offset of the MG_Pcell and the offset of the MG_PScell are configured to be the same, the transmission and reception of UE with UE of the Pcell are not interrupted during the measurement gap length MGL_PScell for the PScell.

If the gap pattern ID of the MG_Pcell is configured to be the same as the gap pattern ID of the MG_PScell, and the offset of the MG_Pcell and the offset of the MG_PScell are configured to be different from each other by 6 ms or more, transmission and reception of UE with the Pcell may be interrupted during the measurement gap length, that is, and MGL_PScell for the PScell. The interruption occurs for two subframes.

If the gap pattern ID of the MG_Pcell is set to 0, and the gap pattern ID of the MG_PScell is set to 1, and if the offset of the MG_Pcell and the offset of the MG_PScell are configured to be the same, transmission and reception of UE with the PScell may be interrupted during the measurement gap length for the Pcell, that is, the MGL_Pcell. The interruption occurs for two subframes every 80 ms. Further, transmission/reception of UE with the Pcell is not interrupted during the measurement gap length, that is, MGL_PScell for the PScell.

If the gap pattern ID of the MG_Pcell is set to 0, the gap pattern ID of the MG_PScell is set to 1, and, further, if the offset of the MG_Pcell and the offset of the MG_PScell are configured to differ from each other by 6 ms or more, transmission/reception of UE with the Pcell is interrupted during the measurement gap length for the PScell, that is, MGL_PScell. The interruption occurs for two subframes every 80 ms. During the measurement gap length for Pcell, that is, MGL_Pcell, the transmission and reception of UE with the PScell are interrupted. The interruption occurs for two subframes every 40 ms. To minimize this interruption, the applicants propose that the base station configures the offset of MG_Pcell and the offset of MG_PScell so that MGL_Pcell and MGL_PScell are overlapped with each other as much as possible.

II-1-2. When Applying Independent Measurement Gaps (MGs) to Pcell and PScell in Asynchronous Dual Connectivity (DC) Mode.

Transmission and reception of UE with the Pcell are interrupted during the measurement gap length, that is, MGL_Pcell for the Pcell. In addition, transmission and reception of UE with the Pcell are interrupted on the first and last subframes of the measurement gap length, that is, MGL_PScell period for the PScell. This interruption period may vary depending on the gap pattern ID and offset of the measurement gap (MG). This will be described in detail as follows.

As in the previous section II-1-1, if the gap pattern ID of the MG_Pcell and the gap pattern ID of the MG_PScell are configured to be the same, and further if the offset of the MG_Pcell and the offset of the MG_PScell are configured to be the same, the transmission and reception of UE with the Pcell are not interrupted during the measurement gap length MGL_PScell of the PScell.

Further, as in the previous section II-1-1, if the gap pattern ID of the MG_Pcell and the gap pattern ID of the MG_PScell are configure to be the same, and the offset of the MG_Pcell and the offset of the MG_PScell are configured to differ from each other by 6 ms or more, transmission and reception of UE with the Pcell may be interrupted during the measurement gap length for PScell, that is, MGL_PScell. The interruption period corresponds to two subframes.

Moreover, as in the previous II-1-1, if the gap pattern ID of the MG_Pcell is set to 0, the gap pattern ID of the MG_PScell is set to 1, and the offset of the MG_Pcell and the offset of the MG_PScell are configured to be the same, the transmission and reception of UE with the PScell are interrupted during the measurement gap length for Pcell, that is, MGL_Pcell. The interruption occurs for two subframes every 80 ms. Further, transmission and reception of UE with the Pcell are not interrupted during the measurement gap length, that is, MGL_PScell for the PScell.

Further, as in the previous section II-1-1, when the gap pattern ID of MG_Pcell is set to 0, the gap pattern ID of MG PS cell is set to 1, and if the offset of MG_Pcell and the offset of MG_PScell are configured to differ from each other by 6 ms or more, transmission and reception of UE with the Pcell are interrupted during the measurement gap length for PScell, that is, MGL_PScell. The interruption occurs for two subframes every 80 ms. Further, during the measurement gap length for Pcell, that is, MGL_Pcell, transmission and reception of UE with the PScell are interrupted. The interruption occurs for two subframes every 40 ms. In order to minimize this interruption, the applicants propose that the base station should configure the offset of MG_Pcell and the offset of MG_PScell so that MGL_Pcell and MGL_PScell overlap as much as possible.

III. Summary of the Embodiments of the Present Disclosure

Conventionally, assuming that the UE includes only one RF chain, the base station provides only one measurement gap (MG) to the UE. However, although the UE has been improved to include more than one RF chains for carrier aggregation (CA) and dual connectivity (DC), the base station still provides only one measurement gap (MG) to the UE. This leads to an inefficient measurement.

Therefore, when the UE has multiple RF chains, the following proposal is made:

When Scell (that is, SCC) is active,

When the measurement gap (MG) is applied, the Pcell and Scell do not perform the scheduling for 6 ms, which is the measurement gap length (MGL).

In order to increase the transmission/reception efficiency of UE with the Pcell, it is advantageous for UE to apply the measurement gap (MG) to the RF chain for the scell and not to apply the MG to the RF chain for the Pcell.

When the RF chain for the Scell is frequency-retuned during the measurement gap length (MGL), the transmission and reception of UE with the Pcell are interrupted on the two subframes.

In order to increase the transmission/reception efficiency of UE with the scell, it is advantageous for UE to apply the measurement gap (MG) to the RF chain for the Pcell and not to apply the ME to the RF chain for the Scell.

When the RF chain for the Pcell is frequency-retuned during the measurement gap length (MGL), the transmission and reception of UE with the Scell are interrupted for the two subframes.

Therefore, the base station needs to know a RF chain to which the UE applies the measurement gap (MG), so that the base station may schedule the subframe more efficiently. Therefore, the UE may transmit to the base station an indication to indicate which carrier (which cell) that has been subjected to the measurement gap by UE. If the UE does not transmit the indication, the base station may assume that the measurement gap is applied to Scell, that is, SCC.

ii) When Scell, that is, SCC is Inactive

The measurement gap (MG) may be applied to the RF chain for the Pcell. If the RF chain for the inactive Scell may be used for measurement of inter-frequency and inter-RAT, the measurement gap may not be applied to the RF chain for the Pcell.

The embodiments of the present invention as described above may be implemented using various means. For example, the embodiments of the invention may be implemented using hardware, firmware, software, or a combination thereof. More specifically, the description thereof will be made with reference to the drawing.

Figure 19:
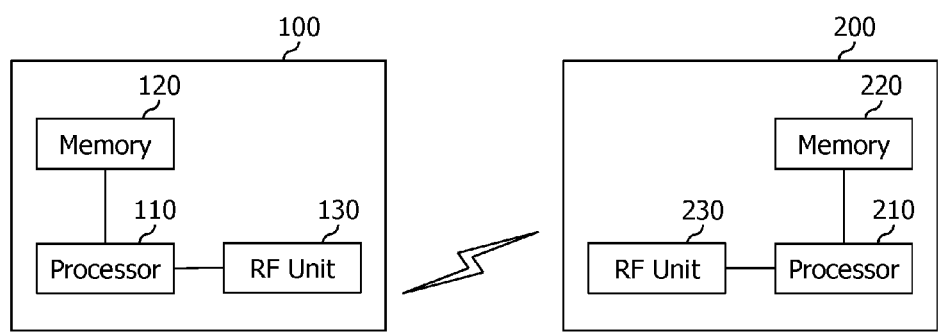
FIG. 19 is a block diagram illustrating a wireless communication system configured to implement the embodiments of the present disclosure.

FIG. 19 is a block diagram illustrating a wireless communication system configured to implement the embodiments of the present disclosure.

The base station 200 includes a processor 201, a memory 202, and a radio frequency (RF) unit 203. The memory 202 is connected to the processor 201 and stores various information for driving the processor 201. The RF unit 203 is connected to the processor 201 to transmit and/or receive wireless signals. The processor 201 implements the proposed functions, processes and/or methods. In the above-described embodiments, the operation of the base station may be implemented by the processor 201.

The UE 100 includes a processor 101, a memory 102 and an RF unit 103. The memory 102 is connected to the processor 101 and stores various information for driving the processor 101. The RF unit 103 is connected to the processor 101 to transmit and/or receive wireless signals. The processor 101 implements the proposed functions, processes and/or methods.

The processor may include an application-specific integrated circuit (ASIC), other chipset, logic circuitry and/or data processing unit. The memory may include read-only memory (ROM), random access memory (RAM) and flash memory, memory cards, storage media, and/or other storage devices. The RF unit may include a baseband circuit for processing a radio signal. When the embodiments are implemented in software, the above-described techniques may be implemented using modules (processes, functions, etc.) that perform the functions described above. The modules may be stored in the memory and may be executed by the processor. The memory may be internal or external to the processor, and may be coupled to the processor by various well known means.

Although the method is described on the basis of a flowchart as a series of steps or blocks, the present invention is not limited to the order of the steps, and some steps may occur in different orders or simultaneously. It will also be appreciated by those skilled in the art that the steps shown in the flowchart are not exclusive and that other steps may be included or that one or more steps in the flowchart may be deleted without affecting the scope of the invention.

What is claimed is:

1. A method for performing measurement by a wireless device having a plurality of radio frequency (RF) chains to support aggregation of a plurality of carriers, the method comprising:
    receiving measurement configuration information from a base station, wherein the measurement configuration information includes information related to a measurement gap in which measurement of an inter-frequency is performed;
    when the received measurement gap is one, determining a carrier among the plurality of carriers, wherein the one measurement gap is to be applied to a RF chain among the plurality of RF chains related to the determined carrier;
    applying the one measurement gap to the determined RF chain to perform the measurement of the inter-frequency to obtain a measurement result; and
    transmitting a measurement report including the measurement result to the base station,
    wherein when the received measurement gap is one, the measurement report includes information used for informing the determined carrier related to the determined RF chain, to which the measurement gap is applied.

2. The method of claim 1, wherein the determining the carrier includes determining that the measurement gap is to be applied to a RF chain for a primary cell in a carrier aggregation (CA).

3. The method of claim 1, wherein the information related to the measurement gap includes at least one of a gap pattern ID, a measurement gap length (MGL) and a gap offset,
wherein the measurement configuration information further includes a measurement cycle for a secondary cell when the secondary cell in a carrier aggregation (CA) is in an inactive state, and
wherein a measurement on the inactive secondary cell is performed based on the measurement cycle for the secondary cell.

4. The method of claim 3, wherein the measurement cycle for the secondary cell and the measurement gap are determined to prevent a time period, in which the RF chain is returned based on the measurement gap, from overlapping a time period, in which the measurement on the inactive secondary cell Scell is performed based on the measurement cycle for the secondary cell.

5. The method of claim 3, wherein the measurement gap is determined to be allocated within a time period in which the measurement on the inactive secondary cell is not performed.

6. The method of claim 3, further comprising transmitting capability information to the base station, the capability information including at least one of information about carrier aggregation (CA) capability and information about dual connectivity (DC) capability.

7. The method of claim 6, wherein when the transmitted capability information used for informing that the wireless device has the carrier aggregation (CA) capability or the dual connectivity (DC) capability, the received measurement configuration information includes information on a plurality of measurement gaps.

8. The method of claim 7, wherein the plurality of measurement gaps include first and second measurement gaps, and
wherein a gap pattern ID of the first measurement gap and a gap pattern ID of the second measurement gap are configured to be equal to each other, and a gap offset of the first measurement gap and a gap offset of the second first measurement gap are configured to be equal to each other.

9. The method of claim 7, wherein when the plurality of measurement gaps are received by the wireless device, the measurement cycle for the secondary cell and the plurality of measurement gaps are configured to prevent subframes related to the plurality of measurement gaps from overlapping a subframe related to the measurement cycle for the secondary cell.

10. A wireless device for performing measurement, the wireless device including a plurality of radio frequency (RF) chains to support aggregation of a plurality of carriers, the wireless device comprising:
a transceiver configured to receive and transmit a radio signal; and
a processor operatively connected to the transceiver, wherein the processor is configured to:
control the transceiver to receive measurement configuration information from a base station, wherein the measurement configuration information includes information related to a measurement gap in which measurement of an inter-frequency is performed;
when the received measurement gap is one, to determine a carrier among the plurality of carriers, wherein the one measurement gap is to be applied to a RF chain among the plurality of RF chains related to the determined carrier;
apply the one measurement gap to the determined RF chain to perform the measurement of the inter-frequency to obtain a measurement result; and
control the transceiver to transmit a measurement report including the measurement result to the base station,
wherein when the received measurement gap is one, the measurement report includes information used for informing the determined carrier related to the determined RF chain, to which the measurement gap is applied.

11. The wireless device of claim 10, wherein the processor is configured to determine that the measurement gap is to be applied to a RF chain for a primary cell in a carrier aggregation (CA).

12. The wireless device of claim 10, wherein the information related to the measurement gap includes at least one of a gap pattern ID, a measurement gap length (MGL) and a gap offset,
wherein the measurement configuration information further includes a measurement cycle for a secondary cell when the secondary cell in a carrier aggregation (CA) is in an inactive state, and
wherein a measurement on the inactive secondary cell is performed based on the measurement cycle for the secondary cell.

13. The wireless device of claim 12, wherein the measurement cycle for the secondary cell and the measurement gap are determined to prevent a time period, in which the RF chain is returned based on the measurement gap, from overlapping a time period in which the measurement on the inactive secondary cell is performed based on the measurement cycle for the secondary cell.

14. The wireless device of claim 12, wherein the measurement gap is determined to be allocated within a time period in which the measurement on the inactive secondary cell is not performed.

15. The wireless device of claim 12, wherein the processor is further configured to enable the transceiver to transmit capability information to the base station, the capability information including at least one of information about carrier aggregation (CA) capability and information about dual connectivity (DC) capability.

16. The wireless device of claim 15, wherein when the transmitted capability information used for informing that the wireless device has the carrier aggregation (CA) capability or the dual connectivity (DC) capability, the received measurement configuration information includes information on a plurality of measurement gaps.

17. The wireless device of claim 16, wherein the plurality of measurement gaps include first and second measurement gaps, and
wherein a gap pattern ID of the first measurement gap and a gap pattern ID of the second measurement gap are configured to be equal to each other, and a gap offset of the first measurement gap and a gap offset of the second first measurement gap are configured to be equal to each other.

* * * * *